United States Patent
Chen et al.

(10) Patent No.: US 10,761,216 B2
(45) Date of Patent: Sep. 1, 2020

(54) MULTIPLE EPOCH GNSS CARRIER PHASE INTEGER RESOLUTION

(71) Applicant: The Regents of the University of California, Oakland, CA (US)

(72) Inventors: Yiming Chen, Torrance, CA (US); Sheng Zhao, Sunnyvale, CA (US); Jay A. Farrell, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 239 days.

(21) Appl. No.: 15/753,136

(22) PCT Filed: Aug. 17, 2016

(86) PCT No.: PCT/US2016/047411
§ 371 (c)(1),
(2) Date: Feb. 15, 2018

(87) PCT Pub. No.: WO2017/031236
PCT Pub. Date: Feb. 23, 2017

(65) Prior Publication Data
US 2018/0239030 A1  Aug. 23, 2018

Related U.S. Application Data

(60) Provisional application No. 62/206,058, filed on Aug. 17, 2015.

(51) Int. Cl.
*G01S 19/44* (2010.01)
*G01S 19/47* (2010.01)
*G01S 19/41* (2010.01)

(52) U.S. Cl.
CPC .............. *G01S 19/44* (2013.01); *G01S 19/41* (2013.01); *G01S 19/47* (2013.01)

(58) Field of Classification Search
CPC .......... G01S 19/44; G01S 19/41; G01S 19/47; G01S 19/32; G01S 19/43; G01S 19/04; G01S 19/36
(Continued)

(56) References Cited

U.S. PATENT DOCUMENTS

2008/0297408 A1   12/2008   Dai et al.
2011/0181462 A1   7/2011   Lawrence
(Continued)

FOREIGN PATENT DOCUMENTS

| CN | 108463741 | 8/2018 |
| KR | 1020180041212 | 4/2018 |
| WO | WO-2017031236 A1 | 2/2017 |

OTHER PUBLICATIONS

"European Application Serial No. 16837774.5, Extended European Search Report dated Apr. 4, 2019", 6 pgs.
(Continued)

*Primary Examiner* — Harry K Liu
(74) *Attorney, Agent, or Firm* — Schwegman Lundberg & Woessner, P.A.

(57) ABSTRACT

Various embodiments each include systems, methods, devices, or software for integer ambiguity resolution approach over a time window of GNSS/IMU data. One purpose of processing a window of data is to enhance the reliability of obtaining high-accuracy position estimation, using carrier-phase measurements, even in challenging environments.

14 Claims, 8 Drawing Sheets

(58) Field of Classification Search
USPC .................................................. 342/357.27
See application file for complete search history.

(56) References Cited

U.S. PATENT DOCUMENTS

2012/0286991 A1* 11/2012 Chen ....................... G01S 19/04
342/357.23
2013/0176171 A1 7/2013 Webber et al.

OTHER PUBLICATIONS

Chen, Yiming, "A New Approach for Computationally Efficient and Reliable Carrier Integer Ambiguity Resolution in GPS/INS", UC Riverside Electronic Theses and Dissertations, (Dec. 1, 2014), 212 pgs.
"International Application Serial No. PCT/US2016/047411, International Preliminary Report on Patentability dated Mar. 1, 2018", 6 pgs.
Chen, Yiming, et al., "Computationally Efficient Carrier Integer Ambiguity Resolution in GPS/INS: A Common-Position-Shift Approach", *IEEE Transactions on Control Systems Technology*, vol. 24, Issue 5, (2016), (2016), 1-16.
International Application Serial No. PCT/US2016/047411, International Search Report and Written Opinion dated Oct. 31, 2016, 6 pgs.

* cited by examiner

MULTIPLE EPOCH GNSS CARRIER PHASE INTEGER RESOLUTION

RELATED APPLICATION AND PRIORITY CLAIM

This application is a U.S. National Stage Filing under 35 U.S.C. 371 from International Application No. PCT/US2016/047411, filed on Aug. 17. 2016, and published as WO 2017/031236 A1 on Feb. 23, 2017, which claims the benefit of priority under 35 U.S.C. § 119(e) to U.S. Provisional Application No. 62/206,058, filed on Aug. 17, 2015 and entitled "MULTIPLE EPOCH GNSS CARRIER PHASE INTEGER RESOLUTION INCORPORATING IMU," the entirety of each of which is incorporated herein by reference.

BACKGROUND INFORMATION

Current Global Navigation Satellite Systems (GNSS), such as Global Positioning Systems (GPS), must compensate for multiple error sources. One challenging technical issue that exists in Real-Time Kinematic (RTK) GNSS navigation is integer ambiguity resolution. Once the integer vector is resolved, centimeter-level positioning estimation accuracy can be achieved using the GNSS carrier-phase measurements. Recently, a real-time, sliding window, Bayesian estimation approach to RTK GNSS and inertial navigation was proposed to provide reliable centimeter-accurate state estimation, via integer ambiguity resolution utilizing a prior along with all Inertial Measurement Unit (IMU) and GNSS measurements within the time window. One challenge to implementing that approach in practice is the high computational cost.

Integration of GNSS and aided inertial navigation systems (INS) has proven useful due to their complementary natures. The INS provides a continuous, high-bandwidth state vector estimate. GNSS aiding corrects errors accumulated by the integrative INS process and calibrates the IMU. The overall accuracy of GNSS-aided INS depends on the accuracy, frequency, and reliability of the GNSS measurements. For example, a well-designed GPS receiver typically can reach stand-alone positioning accuracy of 3 m to 8 m. To achieve higher accuracy positioning reliably, differential GPS (DGPS) is used. With a base station within a range of a few tens of kilometers, DGPS accuracy is on the order of 1 m, growing at the rate of 1 m per 150 km of separation. A user can either set up a base station on their own or use data from a publicly available correction service, such as Continuously Operating Reference Station (CORS), Nationwide Differential Global Positioning System (NDGPS), and the Regional Reference Frame Sub-Commission for Europe (EUREF). As mobile communication networks (e.g., 4G or WiFi) become readily available, DGPS techniques will become ubiquitous.

GNSS receivers provide carrier-phase measurements that are biased by an unknown integer number of wavelengths. While the Phase-Lock-Loop (PLL) of a receiver channel maintains phase lock, the unknown integer for the satellite being tracked remains constant. When loss-of-lock eventually happens (e.g., a cycle-slip occurs), the new integer is likely to be different. The fundamental ideas underlying integer ambiguity resolution rely on reformulating the problem into an Integer Least Square (ILS) approach, e.g. Least-squares AMBiguity Decorrelation Adjustment (LAMBA), modified LAMBDA (MLAMBDA), or Mixed IntegerLEast Squares (MILES). RTK applications solve the ILS and position estimation problems simultaneously in real-time. Solution of the RTK problem is simplified, yet still challenging, when dual-frequency receivers are available, because the integers can be resolved by forming wide-lane phase measurements. When the integer vector can be resolved, centimeter positioning-accuracy is achievable in real-time on moving platforms. The performance of the conventional single-epoch resolution is strongly influenced by the number of available satellites, the geometry of the received satellite constellation, and the quality of the measurements. If noisy or faulty measurements exist, the integer resolution can be wrong, without sufficient measurement redundancy to detect the error. For single-frequency receivers, integer ambiguity resolution is even more challenging due to the inability to form the wide-lane measurement and the smaller number (e.g., half) of measurements.

Measurement redundancy enhances the ability to identify the correct integers at the expense of additional computation. For either single or dual frequency receivers, redundancy can be enhanced by accumulating GNSS measurements over a multi-epoch window. The redundancy is further enhanced when an inertial measurement unit (IMU) is available to provide kinematic constraints between the state vectors at the epoch measurement times. What is needed for real-time applications is a computationally-efficient solution for integer ambiguity resolution combining GNSS, IMU, and prior knowledge of state information (e.g., a priori state information).

In the following detailed description of systems and methods for carrier-phase integer resolution, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be used and that structural, logical, electrical, and other changes may be made without departing from the scope of the inventive subject matter. Such embodiments of the inventive subject matter may be referred to, individually and/or collectively, herein by the term "invention" or "subject matter" merely for convenience and without intending to limit the scope of this application voluntarily to any single invention or inventive concept if more than one is in fact disclosed. The following description is, therefore, not to be taken in a limited sense, and the scope of the inventive subject matter is defined by the appended claims.

DETAILED DESCRIPTION

Figure 1:
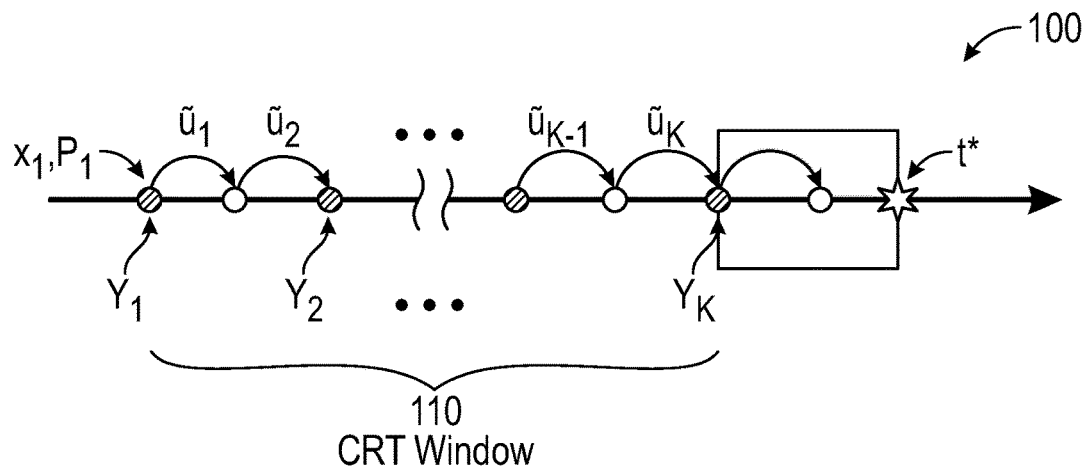
FIG. 1 shows a Contemplative Real-Time (CRT) window measurement timeline, according to some embodiments.

To address the limitations of current GNSS navigation solutions, the present subject matter improves the processing of a machine by reducing the computational cost required in carrier-phase integer resolution. As described herein, this solution realizes significantly lower computational requirements. Implementation results show that the proposed methods and systems resolve an integer vector identical to that of the original method while achieving state estimation with centimeter-level global positioning accuracy.

This disclosure discusses an integer ambiguity resolution approach over a time-window of GNSS/IMU data. One purpose of processing a window of data is to enhance the reliability of obtaining high-accuracy position estimation, using carrier-phase measurements, even in challenging environments. This disclosure discusses portions of this ambiguity resolution approach from the perspective of a GPS solution, however this integer ambiguity resolution approach is broadly applicable to other GNSS enhancement solutions. The high-accuracy position estimation provided by the integer ambiguity resolution may be used in various positioning and navigation applications, including wearable navigation devices, mobile electronic devices, remote tracking devices, guided weapons, or manned and autonomous vehicles (e.g., aerial vehicles, space vehicles, terrestrial vehicles, naval vehicles, etc.) This high-accuracy position estimation may be implemented in a single device, or may be networked and aggregated over a distributed system. The present subject matter includes outlier detection to improve reliability, however further development of enhanced outlier detection methods is beyond the scope of this disclosure.

The Common Position Shift (CPS) method introduced herein has focused on reduction of computational cost. Theoretically, the achievable computational savings should be a factor of 10,000, while 600 has been demonstrated. The analysis shows that the estimation accuracy of the original and CPS algorithms would be identical if the GNSS measurements were linear and time invariant, and presents bounds on the errors incurred due to the measurement nonlinearity and time dependence.

The theoretical approach is also interesting in that it shows that the cost function can be decomposed into one part that determines the shape and vicinity of the trajectory, but is insensitive to the carrier-phase integers and a position shift vector; and, a second part that is sensitive to the carrier-phase integer and can be solved to determine the required position shift so that the location of the trajectory is accurately known. Theoretical analysis is presented for the CPS method. Implementation results show that the proposed CPS method obtains integer estimates identical to those from the original full MILS method, obtains centimeter positioning-accuracy, and that other state estimation errors are small.

The functions or algorithms described herein may be implemented in hardware, software, firmware or various combination of software, firmware, and hardware. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, a mobile device, server, a router, or other device capable of processing data including network interconnection devices. Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 shows a CRT window measurement timeline 100, according to some embodiments. Some GNSS navigation solutions may include a Contemplative Real-Time (CRT) approach to provide a reliable differential GNSS/INS solution. Within the CRT framework, the full nonlinear Maximum-A-Posteriori (MAP) estimation problem is solved considering all the information (e.g., prior, kinematics, sensor data) available within a time window. The CRT approach provides a large enough set of residuals to extend receiver autonomous integrity monitoring (RAIM)-like techniques to reduce the effects of the outlier measurements on the estimation and to detect incorrect integers. Integer ambiguity resolution is considered within the CRT framework, for the RTK GNSS/INS application. An embodiment could include the use of graph optimization libraries.

One challenge to implementing reliable integer ambiguity resolution is the high computational load, especially when the CRT window is long or the IMU sampling rate is high. This disclosure considers an alternative implementation approach with significantly lower computational cost. The validity of the approach is demonstrated theoretically and performance is demonstrated experimentally. Implementation results show that the proposed method achieves the centimeter-level global positioning accuracy on moving platforms in challenging GNSS environments, gets integer estimates identical to those from the original CRT method.

This section presents background and notation used in describing the CRT window measurement timeline 100, and in particular, Aided Inertial Navigation background and notation. Let $x \in \mathbb{R}^{n_s}$ denote the rover state vector. For example, the state vector at time t, $$x(t)=[p^T(t), v^T(t), q^T(t), b_a^T(t), b_g^T(t)]^T \in \mathbb{R}^{n_s},$$

is composed of the position, velocity, attitude (e.g., quaternion), accelerometer bias and gyroscope bias vectors.

The kinematic equations for the rover state are $$\dot{x}(t)=f(x(t),u(t)), \qquad (1)$$

where $f: \mathbb{R}^{n_s} \times \mathbb{R}^6 \to \mathbb{R}^{n_s}$ is represents the kinematics, and $u \in \mathbb{R}^6$ is the vector of specific forces and angular rates. The function $f$ is accurately known.

Given a distribution for the initial state $x(t_1) \sim N(x_1, P_1)$ where $x_1 \in \mathbb{R}^{n_s}$, $P_1 \in \mathbb{R}^{n_s \times n_s}$ and measurements $\tilde{u}$ of u, the INS propagates the estimate of the rover state between aiding measurement time instants by solving $$\dot{\hat{x}}(t)=f(\hat{x}(t),\tilde{u}(t)), \qquad (2)$$

where $\hat{x}(t)$ denotes the estimate of x(t) and $\hat{x}(t_1)=x_1$.

For the convenience of later discussion, define $$s(t)=[v^T(t),q^T(t),b_a^T(t),b_g^T(t)]^T \in \mathbb{R}^{(n_s-3)} \qquad (3)$$

as the state vector excluding the position. Then, we have $x(t)=[p^T(t), s^T(t)]^T$. Similarly, $x_1=[p_1^T, s_1^T]^T$ for the prior. Similar notation also applies to those of state estimate $\hat{x}(t)=[\hat{p}^T(t), \hat{s}^T(t)]^T$.

Due to prior errors, system calibration errors, and measurement noise, the state estimation error $\delta x(t) = x(t) - \hat{x}(t)$ develops over time. The dynamics and stochastic properties of this estimation error are derived from equations (1) and (2).

When aiding measurements $$\tilde{z}(t) = h(x(t)) + n_z(t) \quad (4)$$

are available, various methods (e.g., the extended Kalman filter and particle filter) are available to use the initial state, inertial measurements, and aiding measurement information to estimate the rover state vector.

This section presents background and notation used in describing the CRT window measurement timeline 100, and in particular, DGPS Measurements background and notation, though the ambiguity resolution approach discussed herein is broadly applicable to other GNSS enhancement solutions. Throughout this disclosure, double-differenced GNSS measurements are considered. The approach is directly extendable to the use of single-difference GNSS. For notational simplicity, it is assumed that the double difference approach completely removes all common-mode errors (e.g., ionosphere, troposphere, satellite clock, and ephemeris), as well as the receiver clock biases, which allows these terms to be dropped throughout the disclosure. This removal of common-mode errors is done only to simplify the notation of the presentation, these errors will still affect the experimental results; therefore, outlier measurements may exist due to multipath error, heavy foliage, receiver failure, etc.

The double-differenced pseudorange measurement (e.g., code measurement) for the i-th satellite are modeled as $$p^i(t_k) = h_k^i(x(t_k)) + n_p^i(t_k), \quad (5)$$

where $h_k^i(x(t_k)) = \|p(t_k) - p^i(t_k)\|_2$ is the Euclidean distance at $t_k$ between the rover position $p \in \mathbb{R}^3$ and the position of the i-th satellite $p^i \in \mathbb{R}^3$, and $n_p^i \sim N(0, \sigma_p^2)$ represents the (non-common mode) measurement noise with standard deviation $\sigma_p = 0.5 \sim 3$ m, depending on receiver design, environmental factors and the performance of multipath mitigation techniques. In practice, the noise level $\sigma_\rho$ will vary temporally and spatially, and will vary independently for each satellite.

The double-differenced carrier-phase measurement for the i-th satellite is modeled as $$\varphi^i(t_k) = h_k^i(x(t_k)) + \lambda N^i(t_k) + n_\varphi^i(t_k), \quad (6)$$

where $\lambda$ is the carrier phase wavelength, and $N^i$ is the unknown integer ambiguity. The measurement noise has distribution $n_\varphi^i \sim N(0, \sigma_\varphi^2)$. The noise standard deviation $\sigma_\varphi$ ranges from millimeters to centimeters ($<0.01\sigma_\rho$).

The unknown integer $N^i$ represents the number of carrier wave cycles between the satellite and the receiver at the time that phase-lock is achieved. If the PLL in the receiver for the i-th satellite maintains lock without cycle slips during a time interval $[t1, tn]$, then this integer is constant over this time interval, i.e. $N^i(t_1) = \ldots = N^i(t_n) = N^i$. The receiver reports the lock status to enable detection of such time intervals. The unknown integer is estimated exactly or very precisely to enable use of the carrier-phase measurement for precise position estimation. Note that the carrier-phase measurement model does not match the standard measurement model in equation (4), because there is an unknown integer variable $N^i$.

This section presents background and notation used in describing the CRT window measurement timeline 100, and in particular, the CRT window 110. In particular, this section investigates integer ambiguity resolution and trajectory estimation over a time interval $[t_1, t_K]$ that we will refer to as the CRT window 110. As shown in FIG. 1, the CRT window 110 contains a prior state for the initial state, K GNSS measurements, and many IMU measurements between each pair of GNSS measurements. All of these items yield constraints on the estimated trajectory X during the CRT window 110.

This CRT window 110 contains K GNSS measurement epochs, where K can be designer specified, time varying, or data dependent. A typical, but simplified, measurement scenario is depicted in FIG. 1. The dots on the time-line indicate IMU measurement times $\tau_n$. Typically the number of IMU measurements between GNSS measurements is very high (i.e., $t_{i+1} - t_i \gg \tau_{j+1} - \tau_j$). This is because IMU sample frequency (e.g., 200 Hz) is at least twice the IMU bandwidth (e.g., 60 Hz), which is higher than the vehicle motion bandwidth (e.g., 10 Hz). The GNSS sample rate is usually much lower (e.g., 1.0 Hz). The state transition between these times is constrained by the kinematic model of equation (2) and the IMU data. Additional constraints are imposed by the initial estimate (x1, P1) depicted above the initial state, and GNSS measurements depicted below the time-line. Each of these constraints is quantified by a probability density which enables a Bayesian estimation formulation for the CRT estimation problem. The computation for the CRT estimation process considering all the information over the CRT window 110 starts at $t_K$ and completes its computation at $t^* > t_K$. This time interval $(t_K, t^*)$ (shown in FIG. 1 with a box) is a small fraction of a second with standard off-the-shelf computers. For $t \in (t_K, t^*)$, the real-time state estimate is maintained by the INS. At $t^*$, the CRT estimation result $\hat{x}(t_K)$ is propagated by the INS with the IMU data over $(t_K, t^*]$ and used to update and maintain the real-time estimate. Therefore, the INS is effectively free integrating, without corrections, from $t_{K-1}$ to $t^*$. For 1 Hz GNSS epochs, this duration is approximately one second and the INS error accumulation is at the centimeter level.

To simplify the presentation of the ideas in this disclosure, the following assumptions are made:

Assumption 1: Within the CRT window 110, the receiver provides valid carrier-phase measurements for m satellites, without loss of lock.

Assumption 2: The prior distribution for $s(t_1)$ is $N(s_1, P_{s_1})$.

Assumption 3: The GNSS measurement rate is 1 Hz.

With Assumption 1, the unknown integers in the carrier-phase measurements from these m satellites are constants over $[t_1, t_K]$. This assumption will be relaxed in subsequent examples, as discussed below. Assumption 2 allows the system to be initialized at an unknown location, while the partial state estimate $\hat{s}(t_1)$ may be initialized with the prior $(s_1, P_{s_1})$ based on other information sources. The GNSS sampling rate stated in Assumption 3 facilitates the presentation. The entire derivation goes through for other sample rates. Under Assumption 1-3, the CRT estimation problem considered in this disclosure can be stated as follows.

For a system described by equation (1), we have the following:
1) an initial distribution for the state $s(t_1) \sim N(s_1, P_{s_1})$,
2) IMU measurements $U = \{U_k\}_{k=1}^{K-1}$, where $U_k = \{\tilde{u}(\tau_n), t_k \leq \tau_n \leq t_{k+1}\}$, and
3) DGPS code and carrier-phase measurements $Y = \{Y_k\}_{k=1}^{K}$, where $Y_k = \{\rho^i(t_k)\}_{i=1}^{m_k} \cup \{\varphi^i(t_k)\}_{i=1}^{m}$.

Note that: $t_1, \ldots, t_K \in (\tau_1, \tau_\kappa]$. The set $\{\tau_n\}_{n=1}^{\kappa}$ contains the high frequency IMU measurement time instants. The integer $m_k$ is the total number of valid pseudorange measurements at time $t_k$. For simplicity of discussion in this disclosure, it is assumed that $m_k = m$. The method presented in this disclosure can be extended to more complicated mixes of measurements.

Then, objective 1 may be defined as follows: Estimate the optimal state trajectory:

$$X \triangleq [x^T(t_1), \ldots, x^T(t_K)]^T \in \mathbb{R}^{Kn_x}$$

and integers:

$$N \triangleq [N^1, \ldots, N^m]^T \in \mathbb{Z}^m$$

using the given sensor measurements U, Y and the prior state density $p_s(s(t_1))$.

In some solutions, the above objective is achieved by formulating and solving the corresponding Maximum-a-Posteriori estimation problem. The accuracy and reliability of the solution is achieved by the Nonlinear Mixed Integer Least Square method and faulty data removal scheme. This CRT integer ambiguity resolution method is discussed below.

Figure 2:
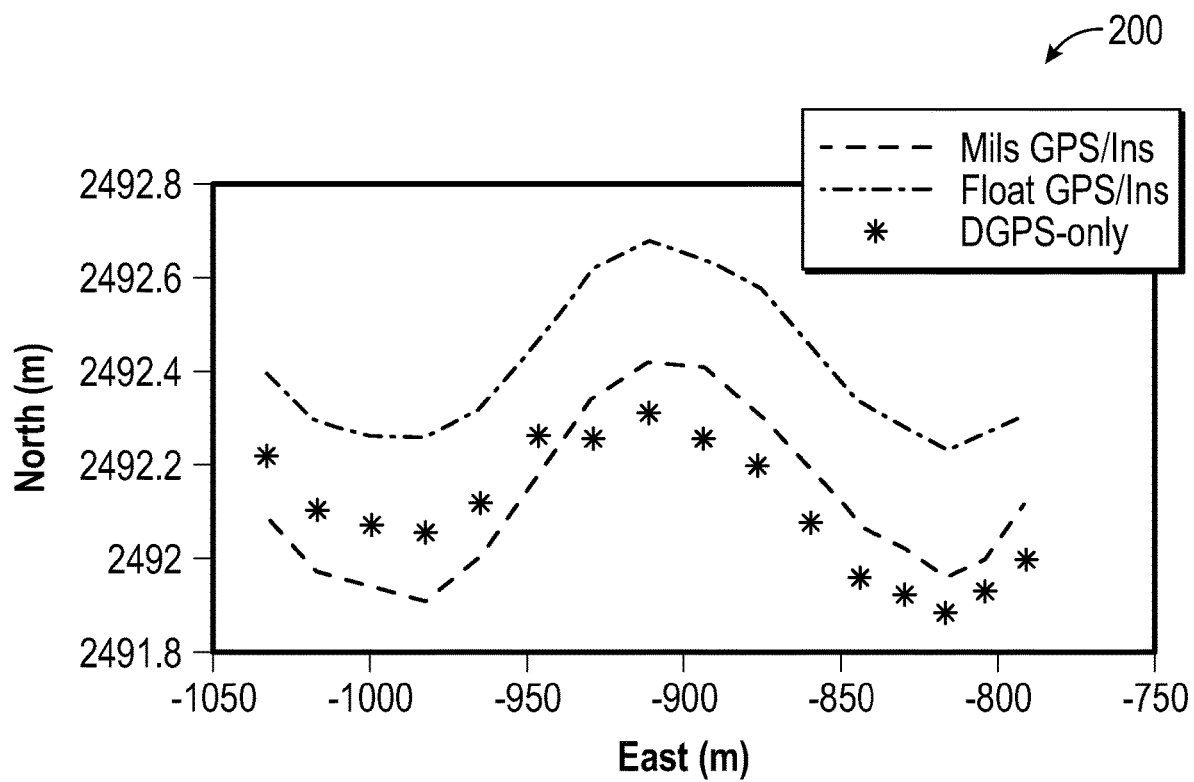
FIG. 2 is a graph of an example comparison of horizontal positioning results, according to some embodiments.

FIG. 2 is a graph of an example comparison of horizontal positioning results 200, according to some embodiments. These horizontal positioning results 200 are derived using the following solution for CRT integer ambiguity resolution. Let $$X_+ \triangleq \{x(t) \text{ for } t = t_2, \ldots, t_K\},$$

then the joint probability $p(X, N, Y, U)$ can be factored as follows:

$$\begin{aligned} p(X, N, Y, U) &= p(X, U, N)p(Y \mid X, U, N) \\ &= p(X_+, x(t_1), U)p(Y \mid X, N) \\ &= p(x(t_1), U)p(X_+ \mid x(t_1), U)p(Y \mid X, N) \\ &= p(x(t_1))p(X_+ \mid x(t_1), U)p(Y \mid X, N) \\ &= p(s(t_1))p(X_+ \mid x(t_1), U)p(Y \mid X, N). \end{aligned} \quad (7)$$

For a given prior $(s_1, P_{s_1})$ and data sets Y and U, the Maximum-a-Posteriori (MAP) trajectory estimate is the X and N maximizing the right hand side of equation (7):

$$\min_{X \in \mathbb{R}^{n_s K}, N \in \mathbb{Z}^m} p(s(t_1))p(X_+ \mid x(t_1), U)p(Y \mid X, N). \quad (8)$$

With a Gaussian noise assumption, the negative log-likelihood of the right hand side of equation (7) is $$\|v(X,N)\|_W^2 = \|s(t_1) - s_1\|_{P_{s_1}}^2 + \quad (9)$$
$$\sum_k \|\phi(x(t_k), U_k) - x(t_{k+1})\|_{Q_k}^2 + \sum_k \sum_i \|h_k^i(x(t_k)) - \rho^i(t_k)\|_{\sigma_\rho^2}^2 + $$
$$\sum_k \sum_i \|h_k^i(x(t_k)) + \lambda N^i - \varphi^i(t_k)\|_{\sigma_\varphi^2}^2$$

where $$\|v\|_W^2 = v^T W^{-1} v$$

is the squared Mahalanobis distance with matrix W. All terms on the right-hand side also use this notation. The vector v is the concatenation of each of the vectors summed in the right-hand side of equation (9). The operator $\phi$ and the covariance matrix $Q_k$ used in equation (9) are defined in Appendix I. The matrix W is the positive definite block diagonal matrix formed by the positive definite submatrices $$Q_k, P_{s_1}, \sigma_\rho^2 I \text{ and } \sigma_\varphi^2 I.$$

Using MATLAB® syntax, W could be represented as $$W = \text{blkdiag}(P_{s_1}, Q_1, \ldots, Q_{K-1}, \sigma_\rho^2 I, \sigma_\varphi^2 I).$$

Let $\Sigma_W^T \Sigma_W = W^{-1}$, then $$r \triangleq \Sigma_W v \quad (10)$$

is the weighted residual, and $$\|v\|_W^2 = \|r\|^2.$$

For notation simplicity, herein we denote the tuple $$(X, N) = [X^T, N^T]^T \in \mathbb{R}^{n_s K} \times \mathbb{Z}^m.$$

With this notation, the MAP problem is transformed into the Nonlinear Mixed Integer Least Square (NMILS) problem, $$(X^*, N^*) = \underset{X \in \mathbb{R}^{n_s K}, N \in \mathbb{Z}^m}{\arg\min} \|r(X, N)\|^2, \quad (11)$$

where r is the vector:

$$r(X,N) = \begin{bmatrix} \sum_{P_{s_1}} (s(t_1) - s_1) \\ \sum_{Q_i} (\phi(x(t_1), U_1) - x(t_2)) \\ \vdots \\ \sum_{Q_{K-1}} (\phi(x(t_{K-1}), U_{K-1}) - x(t_K)) \\ \sigma_\rho^{-1}(h_1^1(x(t_1)) - \rho^1(t_1)) \\ \vdots \\ \sigma_\rho^{-1}(h_K^m(x(t_K)) - \rho^m(t_K)) \\ \sigma_\varphi^{-1}(h_1^1(x(t_1)) + \lambda N^1 - \varphi^1(t_K)) \\ \vdots \\ \sigma_\varphi^{-1}(h_K^m(x(t_K)) + \lambda N^m - \varphi^m(t_K)) \end{bmatrix}.$$

The state of the art CRT integer ambiguity resolution and trajectory estimation approach can be summarized with the following three steps:

1) Obtain the float solution by neglecting the integral nature of the ambiguity N $$(\bar{X}, \bar{N}) = \underset{(X,N) \in \mathbb{R}^{n_s K + m}}{\arg\min} \|r(X, N)\|^2. \quad (12)$$

Standard outlier rejection techniques can be executed to detect and remove outliers.

2) Starting from $(\check{X}, \check{N})$, solve the NMILS problem in equation (11) to obtain the optimal solution $(X^*, N^*)$.

3) Check the validity of integer estimates with integer validation techniques.

As shown in FIG. 2, the dot-dashed curve is for the MILS GPS/INS solution 210 that provides centimeter level accuracy. The dashed curve is for the float solution 220 from equation (12). The asterisks denote the DGPS (only differential pseudorange, no carrier-phase measurements used) positioning solutions 230.

The second step of this CRT integer ambiguity resolution approach is computationally expensive, especially with relinearization, which requires reintegration. An alternative to the second step is the focus of this disclosure.

To solve the optimization in equation (11) in an iterative manner, the residual r(X, N) is linearized around the current estimates:

$$(\hat{X}, \hat{N})$$

where $$r(X,N) \approx r(\hat{X},\hat{N}) + J(\hat{X},\hat{N})(\delta X, \delta N), \quad (13)$$

where $$J(\hat{X},\hat{N})$$

is the Jacobian matrix of $$(X,N), \text{ and } (\delta X, \delta N) = (X,N) - (\hat{X},\hat{N}).$$

is the estimation error. Furthermore, $$J(\hat{X},\hat{N})$$

can be decomposed as $$J(\hat{X},\hat{N}) = [A, B],$$

where A contains the columns of $$J(\hat{X},\hat{N})$$

that are the partial with respect to X and B contains the partial with respect to N. Thus, equation (13) can be rewritten as $$r(X,N) \approx r(\hat{X},\hat{N}) + A\delta X + B\delta N.$$

The next step solves the Mixed Integer Least Square (MILES) problem:

$$\min_{\delta X \in \mathbb{R}^{n_S K}, \delta N \in \mathbb{Z}^m} \left\| r(\hat{X}, \hat{N}) + A\delta X + B\delta N \right\|^2. \quad (14)$$

By dropping the notation $$(\hat{X}, \hat{N})$$

in $$r(\hat{X},\hat{N})$$

and defining the QR-decomposition $$A = [Q_A, \overline{Q}_A] \begin{bmatrix} R_A \\ 0 \end{bmatrix}, \quad (15)$$

the cost function in equation (14) can be factored as $$\|r + A\delta X + B\delta N\|^2 = \left\| \begin{bmatrix} Q_A^T \\ \overline{Q}_A^T \end{bmatrix} r + \begin{bmatrix} R_A \\ 0 \end{bmatrix} \delta X + \begin{bmatrix} Q_A^T B \\ \overline{Q}_A^T B \end{bmatrix} \delta N \right\|^2 \quad (16)$$

$$= \|Q_A^T r + R_A \delta X + Q_A^T B \delta N\|^2 +$$

$$\|\overline{Q}_A^T r + \overline{Q}_A^T B \delta N\|^2.$$

Note that for any fixed δN, the first term on the right hand side of the above equation can be made equal to zero by appropriate choice of δX. Thus, solving the following Integer Least Square (ILS) problem yields the optimum of equation (14), $$\min_{\delta N \in \mathbb{Z}^m} \|\overline{Q}_A^T r + \overline{Q}_A^T B \delta N\|^2. \quad (17)$$

Typically, the ILS solution has two steps: reduction and search. The state-of-the-art reduction method is usually cast as a QRZ-decomposition. The QRZ-decomposition factorizes)

$$\overline{Q}_A^T B$$

to facilitate the integer search process. Each iteration of the NMILS is computationally expensive and multiple iterations may be required, due to the need for relinearization in equation (13) due to changes in X.

Increasing the length K of the CRT window enhances both accuracy and reliability at the expense of a higher computational load. Later in the discussion of the mathematic analysis of the CPS method, the computational load will be summarized in Table I and compared with the CPS algorithm that is developed herein.

One advantage of the systems and methods within this disclosure is to provide an alternative approach to replace Step 2 above. The new approach requires a significantly lower computational load. The general method of proof will be to show first that the two approaches would be equivalent if the GNSS measurement equations were linear and time invariant. Then to develop bounds on the errors incurred due to the GNSS measurement equation nonlinear effects and time variations. By showing that the bounds are small relative to the measurement noise, we present that these errors are irrelevant for practical engineering purposes. The proposed method is inspired by the observation that in practice the optimal solution trajectory X* (with integers resolved) is only different from the float solution $$\check{X}$$

in terms of a common 3-D position error to each state vector in the trajectory, such as shown in FIG. 2. Mathematical analysis in the following discussion verifies this observation.

Figure 3:
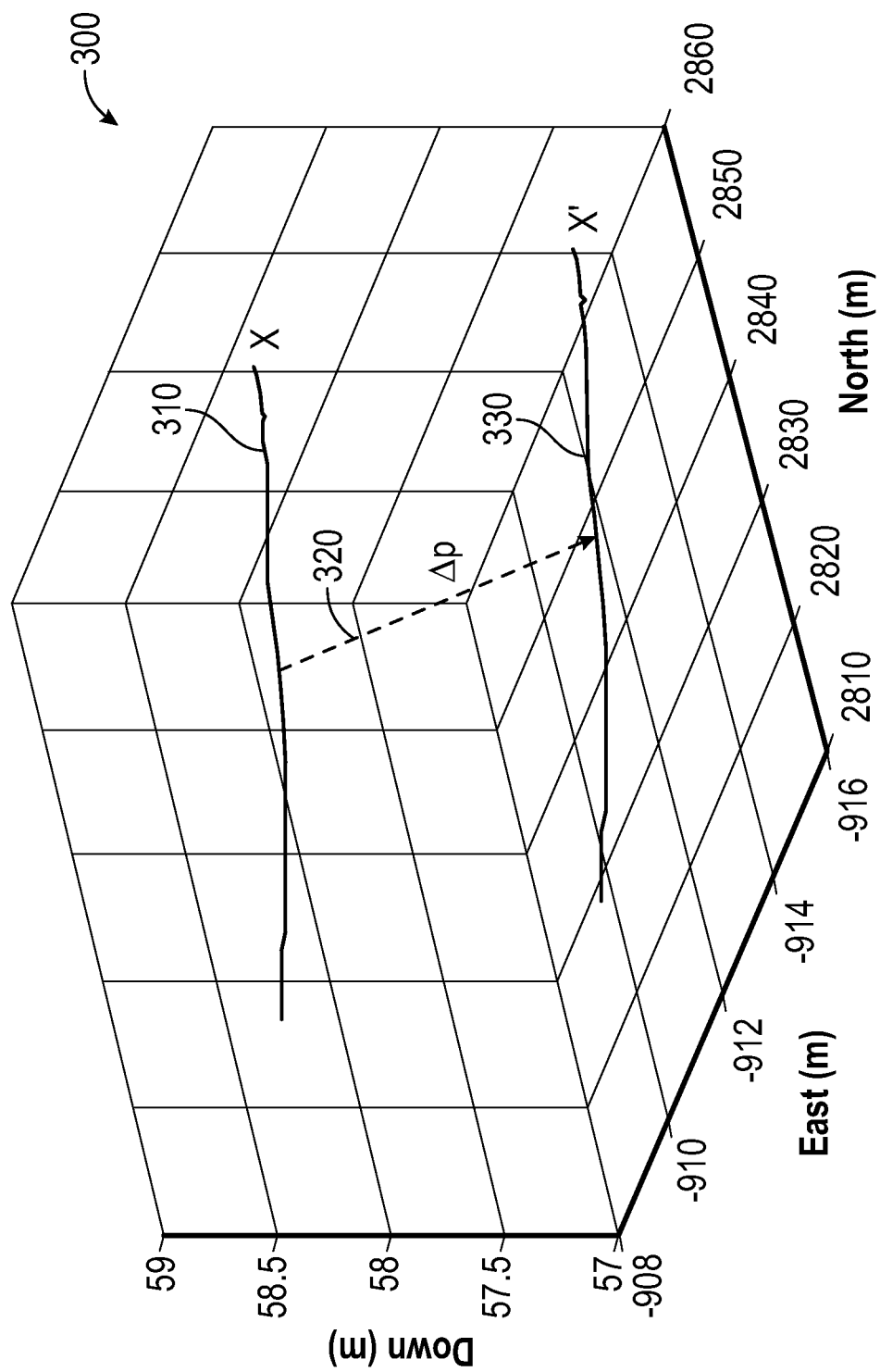
FIG. 3 is a graph depicting three-dimensional (3-D) position shift, according to some embodiments.
Figure 4A:
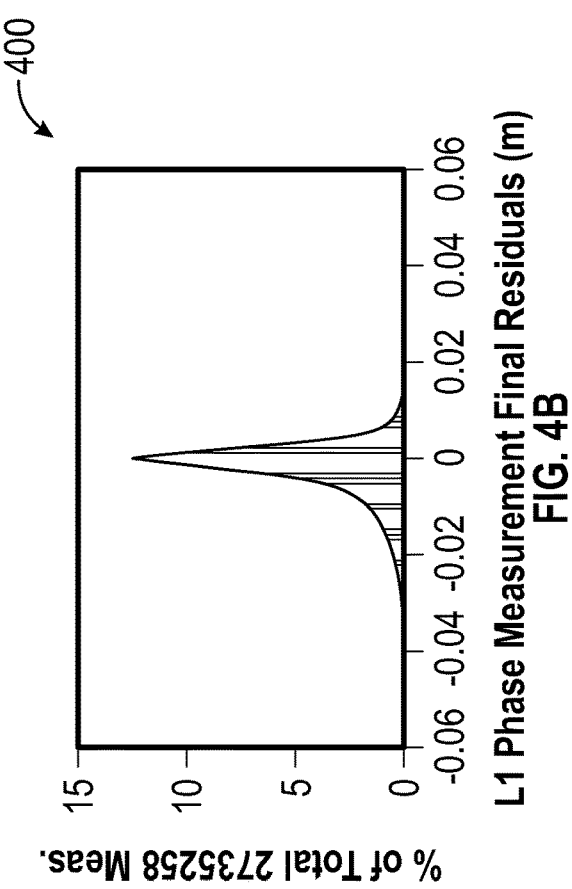
FIGS. 4A-4D depict positioning error and residuals, according to some embodiments.
Figure 4B:
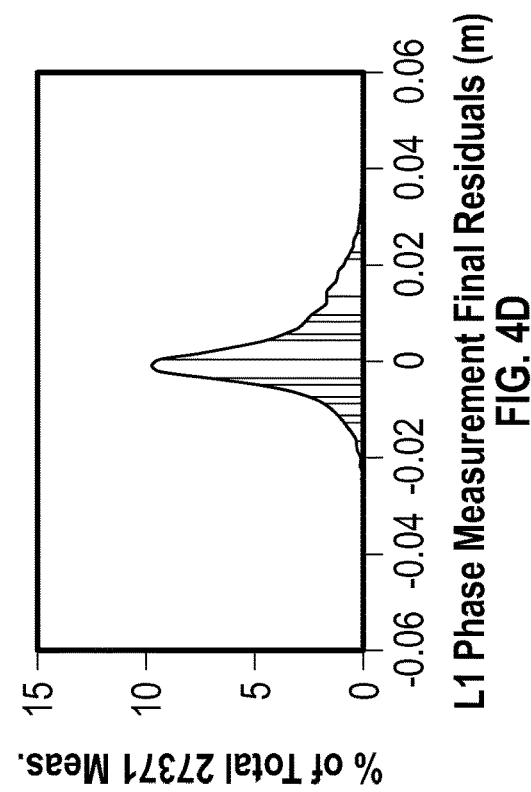
Figure 4C:
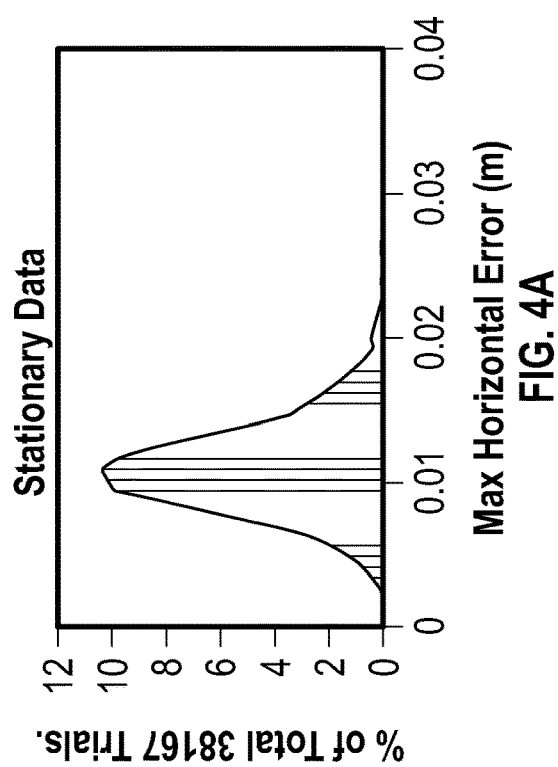
Figure 4D:
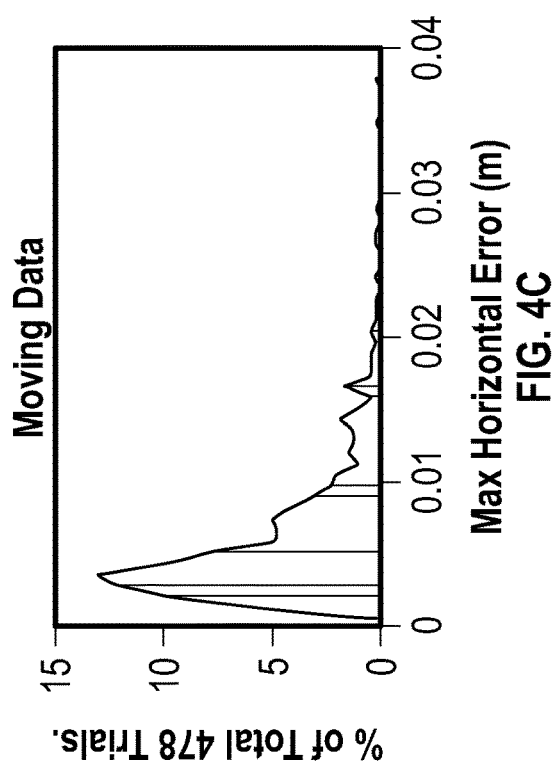

FIG. 3 is a graph depicting 3-D position shift 300, according to some embodiments. To accomplish the increased accuracy and decreased computational requirements, this solution includes a Common-Position-Shift (CPS) method. This CPS method is a computationally efficient alternative to the original CRT method. The key point is to construct a smaller optimization to replace that in Step (2) of the discussion of the original CRT method. First, the notation for the CPS method is defined in the following paragraph.

Given a trajectory $$X = [x^T(t_1), \ldots, x^T(t_K)]^T$$

and a common-position-shift vector $$\Delta p \in \mathbb{R}^3,$$

define the Common Position Shift operator ⊕ as $$X' = X \oplus \Delta p \triangleq [x^T(t_1) \oplus \Delta p, \ldots, x^T(t_K) \oplus \Delta p]^T$$

which denotes adding the constant vector Δp to the position portion, p($t_K$), of each state vector x($t_K$) in X. The resulting trajectory X' is referred as the shifted trajectory with respect to the original X, such as shown in FIG. 3. In particular, FIG. 3 includes the original trajectory 310, the 3-D position shift vector 320, and the shifted trajectory 330.

This section outlines the CPS method itself. The cost function $$\|r(X,N)\|^2$$

of equation (11) can be rewritten as a sum of cost functions:

$$\|r(X,N)\|^2 = \|r_1(X)\|^2 + \|r_2(X)\|^2 + \|r_3(X,N)\|^2. \quad (18)$$

These cost functions have two important related properties. First, the term $$\|r_1(X)\|^2$$

determines the shape, orientation, and general location of the trajectory, but is insensitive to a common position shift $\Delta p$ and to the integer vector N, see Proposition 2. Second, for any given X the terms $$(\|r_2(X)\|^2 + \|r_3(X,N)\|^2)$$

are independent of s and can be minimized solely by the choice of $$(\Delta p, N),$$

see Proposition 3. Therefore, if the linearization errors and the time variation of the GNSS measurement model are ignored, Proposition 4 states that the cost function can be rewritten as $$\|r(X,N)\|^2 = \|r_1(\check{X})\|^2 + \|r_2(\check{X} \oplus \Delta p)\|^2 + \|r_3(\check{X} \oplus \Delta p, N)\|^2$$

where $$X = \check{X} \oplus \Delta p.$$

These facts allow the problem of interest to be solved by the following approach:
1) Find either the float solution $$\check{X}$$

defined in equation (12) or the integer free solution $$X\circledast$$

defined in equation (26), which are shown to be identical to Proposition 1.
2) Find $$(\Delta p^*, N^*)$$

that is the optimal solution of $$\min_{\Delta p \in \mathbb{R}^3, N \in \mathbb{Z}^m} \left\|r_2(\check{X} \oplus \Delta p)\right\|^2 + \left\|r_3(\check{X} \oplus \Delta p, N)\right\|^2, \quad (19)$$

where $$\check{X}$$

is fixed when evaluation $$\|r_2\|^2 + \|r_3\|^2.$$

3) Check the validity of the integer estimates.
The trajectory-integer estimate from the Common-Position-Shift method is finalized as $$(\check{X} \oplus \Delta p^*, N^*).$$

The optimality of the solution $$(\check{X} \oplus \Delta p^*, N^*)$$

is discussed in Propositions 4 and 5 by comparing with (X*, N*) obtained from the original NMILS method revisited in the discussion of the original CRT method.

The Common Position Shift (CPS) estimation in equation (19) is designed to replace the original full NMILS Step (2) in the discussion of the original CRT method. The optimization in equation (19) is also solved by the NMILS method outlined in the discussion of the original CRT method; however, in the new CPS approach, the dimensions are significantly smaller and only a single (linearization) iteration is used.

This subsection defines the cost function decomposition for equation (18). Define $$\varphi^i = [\varphi^i(t_1), \ldots, \varphi^i(t_K)]^T \in \mathbb{R}^K$$

to be the vector stacking the carrier-phase measurements of the i-th satellite. The last summation term in equation (9) can be rewritten as $$\sum_k \sum_i \|h_k^i(x(t_k)) + \lambda N^i - \varphi^i(t_k)\|^2_{\sigma_\varphi^2} = \quad (20)$$

$$\sum_i \left[ \sum_k \|h_k^i(x(t_k)) + \lambda N^i - \varphi^i(t_k)\|^2_{\sigma_\varphi^2} \right] =$$

$$\sum_i \|h^i(X) + \lambda 1 N^i - \varphi^i\|^2_{\sigma_\varphi^2 I},$$

where $$h^i = [h_1^i(x(t_1)), \ldots, h_K^i(x(t_K))]^T \in \mathbb{R}^K, 1 = [1, \ldots, 1,]^T \in \mathbb{R}^K, \text{ and } I \text{ is the } K \times K$$

identity matrix. In particular, 1 is rank 1 and can be QR-decomposed as $$[Q_1, \overline{Q}_1]\begin{bmatrix} \mathcal{R}_1 \\ 0 \end{bmatrix} = 1,$$

where $$[Q_1^T]_{1 \times K} \text{ and } [\overline{Q}_1^T]_{(K-1) \times K}$$

are mappings to the column space and the left null space of 1. Note that we use $$Q_1$$

and $$Q_1$$

as two different notations: the former represents the column spans the column space of 1 while the latter represent the covariance matrix of the first INS cost term in equation (9). Let $$Q = [Q_1, \overline{Q}_1],$$

which is a unitary matrix. The QR-decomposition can be computed offline for different K.

The i-th term in (20) can be decomposed into two parts by projecting it on the column space and the left null space of 1, $$\|h^i(X) + \lambda 1 N^i - \varphi^i\|^2_{\sigma_\varphi^2 I} = \|Q^T(h^i(X) + \lambda 1 N^i - \varphi^i)\|^2_{Q^T \sigma_\varphi^2 Q} \quad (21)$$

$$= \left\| \begin{bmatrix} Q_1^T \\ \overline{Q}_1^T \end{bmatrix} \left[h^i(X) + \lambda Q \begin{bmatrix} \mathcal{R}_1 \\ 0 \end{bmatrix} N^i - \varphi^i \right] \right\|^2_{\sigma_\varphi^2 I}$$

$$= \left\| \begin{matrix} Q_1^T h^i(X) + \lambda \mathcal{R}_1 N^i - Q_1^T \varphi^i \\ \overline{Q}_1^T (h^i(X) - \varphi^i) \end{matrix} \right\|^2_{\sigma_\varphi^2 I}$$

$$= \|\overline{Q}_1^T (h^i(X) - \varphi^i)\|^2_{\sigma_\varphi^2 I} +$$

-continued
$$\|Q_1^T h^i(X) + \lambda \mathcal{R}_1 N^i - Q_1^T \varphi^i\|_{\sigma_\varphi^2}^2,$$

where $$I^- = \overline{Q}_1^T \overline{Q}_1$$

is the $(K-1) \times (K-1)$ identity matrix. Note that the first term in equation (21) is independent of the integer ambiguity $N^i$.

Applying the same QR-factorization to the pseudorange summation term in equation (9) and reorganizing yields:

$$\|r(X,N)\|^2 = \|s(t_1) - s_1\|_{P_{s_1}}^2 + \sum_k \|\phi(x(t_k), U_k) - x(t_{k+1})\|_{Q_k}^2 + \quad (22)$$
$$\sum_i \|\overline{Q}_1^T(h^i(X) - \rho^i)\|_{\sigma_\rho^2 I^-}^2 + \sum_i \|\overline{Q}_1^T(h^i(X) - \varphi^i)\|_{\sigma_\varphi^2 I^-}^2 +$$
$$\sum_i \|Q_1^T h^i(X) - Q_1^T \rho^i\|_{\sigma_\rho^2}^2 + \sum_i \|Q_1^T h^i(X) + \lambda \mathcal{R}_1 N^i - Q_1^T \varphi^i\|_{\sigma_\varphi^2}^2.$$

Based on the above expression, it will be convenient to define the following three cost functions. The first cost function:

$$\|r_1(X)\|^2 \triangleq \|s(t_1) - s_1\|_{P_{\#1}}^2 + \sum_k \|\phi(x(t_k), U_k) = x(t_{k+1})\|_{Q_k}^2 +$$
$$\sum_i \|\overline{Q}_1^T(h^i(X) - \rho^i)\|_{\sigma_\rho^2}^2 + \sum_i \|\overline{Q}_1^T(h^i(X) - \varphi^i)\|_{\sigma_\varphi^2 I^-}^2$$

neglects the last two terms in equation (22) of $$\|r(X,N)\|^2.$$

The second function is $$\|r_2(X)\|^2 \triangleq \sum_i \|Q_1^T h^i(X) - Q_1^T \rho^i\|_{\sigma_\rho^2}^2. \quad (23)$$

The third cost function is $$\|r_3(X,N)\|^2 \triangleq \sum_i \|Q_1^T h^i(X) + \lambda \mathcal{R}_1 N^i - Q_1^T \varphi^i\|_{\sigma_\varphi^2}^2 \quad (24)$$

that defines the common position shift and is analyzed in the CPS discussion. With these definitions, $$\|r(X,N)\|^2 = \|r_1(X)\|^2 + \|r_2(X)\|^2 + \|r_3(X,N)\|^2. \quad (25)$$

To simplify expressions in the following discussion, let $$\|r_a(X)\|^2 \triangleq \|r_1(X)\|^2 + \|r_2(X)\|^2$$

$$\|r_b(X,N)\|^2 \triangleq \|r_2(X)\|^2 + \|r_3(X,N)\|^2.$$

Define the integer-free solution as $$X^{\odot} = \arg\min_{X \in \mathbb{R}^{n_s K}} \|r_a(X)\|^2. \quad (26)$$

Proposition 1: If the variable N is treated as a real vector, then for $$\check{X} \text{ and } \check{N}$$

as defined in equation (12)

$$\|r(\check{X},\check{N})\|^2 = \|r_a(X^{\odot})\|^2$$

and $$X^{\circledast} = \check{X}$$

where $$r(X,N)$$

is defined in equation (11).

The proof of proposition 1 is included in the publication "Computationally Efficient Carrier Integer Ambiguity Resolution in GPS/INS: A Common-Position-Shift Approach," authored by Yiming Chen, Sheng Zhao, and Jay A. Farrell, referred to hereinafter as "the Technical Report." Proposition 1 indicates that the integer-free solution is equivalent to the float solution of equation (12). This equivalence will be used in subsequent discussion.

A mathematical analysis of the proposed CPS method is now presented. The optimality of the CPS method is discussed in Propositions 4 and 5.

In the analysis to follow, certain GPS related facts will be used. They are summarized in this paragraph. The standard deviation of the differential pseudorange measurement is $$\sigma_p = 0.5 \sim 3 \text{ meters}.$$

The standard deviation of the differential phase measurement is $$\sigma_\varphi \approx 0.01 \sigma_p.$$

The minimum distance from a receiver on the earth surface to a GPS satellites satisfies $$h_k^i(p_k) = \|p(t_k) - p^i(t_k)\| \geq \underline{D} \triangleq 20000 \text{ km}.$$

The orbital speed of GPS satellite with respect to the ECEF origin satisfies $$\|V^i\| \leq \hat{V} \triangleq 4.0 \text{ km/s}.$$

When the DGPS base station is within a few tens of kilometers, DGPS pseudorange accuracy is in the order of 1 meter (i.e., 1 σ). Herein, it is assumed that there are always proprietary or public base stations (e.g. from CORS) available to the rover within 20 km. Therefore, for the float $\check{X}$, ution $$\|\check{p}(t_k) - p(t_k)\| < \Delta_f = 3 \text{ m}.$$

Proposition 2 quantifies the sensitivity of $\|r_1(\check{X})\|^2$ to a CPS.

Proposition 2: For any trajectory estimate, $$\hat{X} \in \mathbb{R}^{n_s K},$$

Neglecting the time variation and the high-order-terms in the linearization of the GPS measurement model, $$\|r_1(\hat{X} \oplus \Delta p)\|^2 = \|r_1(\hat{X})\|^2. \quad (29)$$

Accounting for the time variation and the high-order-terms in the linearization of the GPS measurement model, for any trajectory estimate $$\hat{X} \in \mathbb{R}^{n_s K}$$

with $$\|\Delta p\| < 10 \text{ km}$$

it is valid that $$\overline{Q}_1^T(h^i(\hat{X} \oplus \Delta p) - \varphi^i) = \overline{Q}_1^T(h^i(\hat{X}) - \varphi^i + \delta_1) \quad (30)$$

$$\overline{Q}_1{}^T(h^i(\hat{X}\oplus\Delta p)-p^i)=\overline{Q}_1{}^T(h^i(\hat{X})-p^i+\delta_1) \quad (31)$$

where $$\delta_1 \in \mathbb{R}^K$$

is a vector of perturbations caused by the common position shift. Furthermore, the magnitude of of $\delta_1$ is bounded by $$\|\delta_1\|_\infty \leq B_1(\|\Delta p\|, \overline{v}), \quad (32)$$

where the real function $B_1: \mathbb{R}_+^2 \mapsto \mathbb{R}_+$ is defined as $$B_1(\|\Delta p\|, \overline{v}) \triangleq K(C_1 + C_2 \overline{v})\|\Delta p\| + \|\Delta p\|^2 / 2\underline{D} \quad (33)$$

and K is the CRT window 110 length in seconds, $$C_1 \triangleq 2.0 \times 10^{-4}, C_2 \triangleq \frac{1}{\underline{D}} = 5.0 \times 10^{-8} s/m, \overline{v}$$

is the upper bound of the rover speed over the window, and $$\|\Delta p\|$$

is the magnitude of common position shift. The proof of Proposition 2 is included in the Tehnical Report.

Remark 1: The intuition behind Proposition 2 is that due to the small variation in $$h^g(p(t)),$$

for small time-windows and small perturbations $\Delta p$, their effect is removed by the linear transformation $$\overline{Q}^T.$$

For typical values (i.e., $K \leq 10, \|\Delta p\| \leq 1.5$ m, $\overline{v} \leq 50$ m/s)

the upper bound on the perturbation $$\|\tilde{H}_k^i \Delta p\|$$

caused by the common position shift is 0.0031 meter, which is a factor of ten smaller than the centimeter noise level of the carrier-phase measurement. Because the perturbation is small relative to the carrier-phase measurement noise and multipath, it can be neglected.

Proposition 3 considers the cost functions $$\|r_2(X)\|^2$$

and $$\|r_3(\hat{X},N)\|^2$$

defined in equations (23-24).

Proposition 3: Consider any two trajectory-integer estimates and $$(\hat{X}_1, \hat{N}_1) \text{ and } (\hat{X}_2, \hat{N}_2).$$

Neglecting the time variation and the high-order-terms in the linearization of the GPS measurement model, there exists a correction $(\Delta p, \delta N) \in \mathbb{R}^3 \times \mathbb{Z}^m$ such that $$\|r_2(\hat{X}_1 \oplus \Delta p)\|^2 + \|r_3(\hat{X}_1 \oplus \Delta p, \hat{N}_1 + \delta N)\|^2 = \|r_2(\hat{X}_2)\|^2 + r_3(\hat{X}_2, \hat{N}_2)\|^2. \quad (42)$$

Define the position errors between trajectories $$\hat{X}_1$$

and $$\hat{X}_2 \text{ as } \delta p_k \triangleq p_k^2 - p_k^3, k=1, \ldots, K.$$

Accounting for the time variation and the high-order-terms in the linearization of the GPS measurement model, if $$\|\delta p_k\| < 10 \text{ km},$$

there exists a correction $$(\Delta p, \delta N) \in \mathbb{R}^3 \times \mathbb{Z}^m$$

such that $$Q_1^T h^i(\hat{X}_1 \oplus \Delta p) + \lambda \tilde{R}_1(\hat{N}_1^i + \delta N^i) - Q_1^T \varphi^i = Q_1^T h^i(\hat{X}_2) + \lambda \tilde{R}_1 \hat{N}_2^i - Q_1^T \varphi^i + Q_1^T \delta_2, \quad (43)$$

$$Q_1^T h^i(\hat{X}_1 \oplus \Delta p) - Q_1^T p^i = Q_1^T h^i(\hat{X}_2) - Q_1^T p^i + Q_1^T \delta_2, \quad (44)$$

where the magnitude of $\delta_2$ is bounded by $$\|\delta_2\|_\infty \leq B_1(\|\Delta p\|, \overline{v}), \quad (45)$$

$B_1$ is defined in equation (33), $$\overline{v}$$

is the upper bound of the rover speed over the window, and $$\|\Delta p\|$$

is the magnitude of common position shift. The proof of Proposition 3 is included in the Technical Report.

Remark 2: Proposition 3 shows when $$K$$

and $$\|\Delta p\|$$

are bounded (e.g. $K \leq 10, \|\Delta p\| \leq 3$ meters), we can minimize $$\|r_2(X)\|^2 + \|r_3(X,N)\|^2$$

to within a small error, just through a common position shift $$\Delta p$$

and adjusting the integer estimates by $$\delta N.$$

Furthermore, the magnitude of the error $$\delta_2$$

is small relative to the noise level of carrier-phase measurements. For example, for $$K \leq 10, \Delta_p \leq 1.5$$

meters and $$\overline{v} \leq 50 \text{ m/s},$$

it follows that $$\|\delta_2\|_\infty \leq 0.0031 \text{ meter}.$$

The major propositions about the optimality of the CPS method are presented as follows.

Proposition 4: If $\delta_1 = 0$ and $\delta_2 = 0$, then the following identity is valid, $$\|r(\tilde{X} \oplus \Delta p^*, N^*)\|^2 = \|r(X^*, N^*)\|^2, \quad (46)$$

where $$\tilde{X}$$

is the float solution from equation (12), $(\Delta p^*, N^*)$ is the CPS solution from equation (19) with and $(X^*, N^*)$ is the full NMILS estimate from equation (11). The proof of Proposition 4 is included in the Technical Report.

Remark 3: This disclosure and proof introduce different trajectories $$\tilde{X}, X^*, X^{\circledast}$$

and trajectory sets $$X_1^*, X_2^* \text{ and } X_*.$$

The proof included in the Technical Report shows that certain components of the cost function have the same value when evaluated for different trajectories or trajectory sets. Taking advantage of this allows definition of the CPS algorithm described in equation (19) that vastly reduces the computational load as summarized in Table I.

Proposition 4 considers the case where the linearization errors do not exist. Proposition 5 analyzes the effect of the linearization errors.

Proposition 5: Accounting for the time variation and the high-order-terms in the linearization of the GPS measurement model, the following inequality is valid $$E\{\|r(\check{X} \oplus \Delta p^*, N^*)\|^2\} \leq (1+C_3) E\{\|r(X^*, N^*)\|^2\},$$

where $$\check{X}$$

is the float solution from equation (12), $$(\Delta p^*, N^*)$$

is the CPS solution from equation (19) with $$\|\Delta p^*\| \leq \Delta_f,$$

and $$C_3 = \frac{Km(4\sigma_\rho^{-2} + 3\sigma_\varphi^{-2})[B_1(\Delta_f, \bar{v})]^2}{(2K-1)m - 3}, (X^*, N^*)$$

is the full NMILS estimate from equation (11) and $$E\{\cdot\}$$

is the expectation operator. The proof of Proposition 5 is included in the Technical Report.

Remark 4: When $$K=10, \Delta_f=1.5, m=7, \sigma_\rho=1.0$$

meters and $$\sigma_\varphi=0.020 \text{ meters}, C_3=0.04.$$

The error between the expected final costs of two optimizations is bounded within 4% of the expected optimum from the full NMILS approach. For the full NMILS solution the residuals at the cm level; therefore, the worst-case perturbations would be 0.4 mm. Thus, Propositions 4 and 5 show that the Common Position Shift is a valid and accurate approximation to the original full NMILS approach.

The implementation results presented below demonstrate that the differences between two estimation match the expected performance.

Table I compares the computation costs of the Direct MILS (see the discussion of the original CRT method) and CPS MILS (see discussion of CPS notation below). In Table I, $$\mathfrak{I}_1$$

represents the number of (linearized) nonlinear least squares iterations used to find in the float solution is Step 1. Similarly, $$\mathfrak{I}_2$$

represents the number of linearized iterations used for integer ambiguity resolution in the ILS problem of Step 2. The IMU sampling rate (e.g. 200 Hz) is $f$.

TABLE I

COMPUTATION COMPARISON

| Step | Process | Direct MILS | CPS MILS |
| --- | --- | --- | --- |
| 1) | Float solution | $O((n_sK)^3) \times J_1$ | $O((n_sK)^3) \times J_1$ |
| 2a) | Integrate INS | $fKn_s \times J_2$ | 0 |
| 2b) | QR of A | $2M(N_s)^2 \times J_2$ | $2(2m)(3)^2 \times J_2$ |
| 2c) | QRZ of $\bar{Q}_A^T B$ | $2(2Km)m^2 \times J_2$ | $2(2m)m^2 \times J_2$ |
| 2d) | Integer Search | $(*) \times J_2$ | $(*) \times J_2$ |
| 3) | Integer Valid. | Km | Km |

Compared with solving the full NMILS in equation (11) directly, the computational cost in equation (19) is significantly reduced due to the much smaller dimension of the real unknown variable $$\Delta p \in \mathbb{R}^3$$

versus $$X \in \mathbb{R}^{n_sK}.$$

In particular, this dimension reduction facilitates the QR-decomposition in equation (15), see Row (2b) in Table I. The dimensions of the corresponding A matrices in the full MILS and CPS MILS are $M \times N_s$ versus $$2m \times 3,$$

where $$M \triangleq n_sK + 2mK - 3$$

is the dimension of the residual vector, $$N_s \triangleq n_sK$$

is the total state dimension of X, and 2 m is the total number of GPS measurements at a single epoch (code- and carrier-phase). Furthermore, while each NMILS iteration of the direct approach requires the expensive INS reintegrations, the CPS NMILS of (19) does not, see Row (2a) in Table I. In the ILS, the reductions step is cast as a QRZ-decomposition which is actually a QR factorization with column pivoting (or column reordering). In CPS MILS, the computation cost on QRZ-decomposition is lower due to the smaller dimension of $$\bar{Q}_A^T B,$$

see Row (2c) in Table I. On the other hand, the computation of the integer search represented with (*) in Row (2d) of Table I will not vary significantly, since the dimension of δN is the same in both approaches. The computation of the float solution and the integer validation is the same in both the Direct MILS and CPS MILS methods.

TABLE II

EXAMPLE COMPARISON OF COMPUTIONAL LOAD:
f = 200, K = 10, $n_s$ = 16, $N_s$ = 160, M = 297 AND m = 7

| Step | Direct MILS | CPS MILS |
| --- | --- | --- |
| 2a) | $3.20 \times 10^4 \times J_2$ | 0 |
| 2b) | $1.52 \times 10^7 \times J_2$ | $2.52 \times 10^2 \times J_2$ |
| 2c) | $1.37 \times 10^4 \times J_2$ | $1.37 \times 10^3 \times J_2$ |

To give a better sense of the computation improvement achieved by the proposed CPS approach, Table II shows a numerical example of computation costs in Row (2a-2c) of Table I. In this example, the IMU frequency is 200 Hz, the CRT window 110 length is K=10 epochs, the dimension of navigation state is $n_s$=16, the average GNSS satellite availability for each epoch is m=7, and then $N_s$=160, M=297. Table II indicates in each step, the CPS approach saves at least 90% of computation. In particular, the computation cost of the QR decomposition in Step (2b) is significantly reduced by an order of $10^5$, if sparsity of matrix A is not exploited in the original Direct MILS approach.

FIGS. 4A-4D depict positioning error and residuals 400, according to some embodiments. This section discusses the practical implementations of the proposed CPS method and resulting position errors and residuals. The computational load has already been discussed. The implementation results in this section demonstrate that the state estimates are close to those of the original approach.

In addition to the integer validation techniques, a threshold $\Delta_f$ for the common position shift is also used as a solution validation "sanity check." This threshold can be picked by the designer based on the expected positioning accuracy of the float solution. After the CPS estimation in equation (19), if $$\|\Delta p^*\| < \Delta_f$$

and N* can be validated with standard integer validation techniques, then the estimate of (X, N) that resulted from this common position shift approach is finalized as $$(\hat{X} \oplus \Delta p^*, N^*).$$

Various alternatives are possible if the CPS solution is invalidated. The residuals could be analyzed in an attempt to detect and remove satellites with noisy or invalid measurements, to improve performance within the current epoch. The original full NMILS in equation (11) could be executed to attempt to get (X*, N*). Alternatively, the float solution $$\tilde{X}$$

could be used to update the real-time state estimates, while at future epochs, the CRT window 110 could be augmented with additional data for the next trial of integer resolution. For example, the designer can choose to slide the current window to the next epoch(s), or extend the length of the current window to accumulate more data. Or, the scheme could just skip the current window and wait for a new window with larger m, which should yield a higher success rate. In the following experiments, $\Delta_f = 3$ m.

For performance evaluation, the proposed approach was implemented in C++ and applied to RTK GPS/INS data sets collected from an automotive vehicle. The on-vehicle GPS/INS suite consists of a NovAtel OEMV3 receiver that outputs GPS pseudorange and carrier-phase measurements at 1 Hz, and a 200 Hz NV-IMU1000 IMU from NAV Technology Co., Ltd. of Beijing, China that outputs the specific forces and angular rate measurements along the three orthogonal axes. The differential GPS information are from the University of California Riverside Ntrip caster (e.g., from http://systems.engr.ucr.edu:2101) that broadcasts raw dual frequency GPS measurements (Message 1004 in RTCM3.1 standard) and the base position (Message 1006 in RTCM3.1 standard) publicly over the internet at 1 Hz and 0.1 Hz, respectively.

Two data sets logged on the vehicle are processed by the CPS approach: (1) a stationary, 12 hours (43200 seconds), data set collected on UC Riverside (UCR) campus, on Mar. 29, 2014; and (2) a moving 640 seconds data set collected while driving near the UCR Center for Environmental Research and Technology (CE-CERT), on Jan. 23, 2014.

Since the purpose of the IMU is to cause the residuals to be insensitive to the vehicle motion, the performance (e.g., position error and residual analysis) on the two datasets should be very similar. The accuracy of the stationary data is much more easily verified. The algorithms were executed on a desktop computer with Intel Core2 Q9400 four-core CPU at 2.66 GHz, 8 GB DDR3 1333 MHz memory, 240 GB SSD disk drive. The program runs in Ubuntu 12.04 64-bit OS within a VMware virtual machine for Windows 7. The total memory used by the virtual machine is up to 4 GB. Under this implementation environment and picking the CRT window 110 length K=10 seconds, the average computing time for one CPS iteration is approximately 0.25 ms versus 150 ms for the original full MILS method, indicating significant (600×) computational performance improvement. The code is capable of real-time or post-processed modes of operation. The results presented here are from post-processing, still running in real-time, using stored data.

For the stationary data, the 3-D position ground truth is pre-surveyed so positioning errors are presented herein to show the integer ambiguity resolution ability of the CPS method. For the moving data sets, the ground truth is unavailable; therefore, the trajectory and integer estimates from the CPS and the original full MILS method are compared, to show that the CPS is an efficient alternative to the full MILS method, while achieving the same level of accuracy. For both implementations, dual frequency carrier-phase measurements are used to form wide-lane phase measurements. For both stationary and moving data, histograms of the L1 carrier-phase measurements residuals are used as a second method to illustrate CRT accuracy. A 10° elevation mask is applied to GPS satellites. Integers were resolved only when the CRT windows contained at least five satellites. In the evaluation of the CPS approach, the initial condition and prior term in the cost function of equation (9) only includes defined in equation (3). There is no prior for the position or integer. Therefore, the integer solution for each CRT window 110 are independent. After estimation at each time step, a residual check is used to validate the integer estimates. If the magnitude of a carrier-phase measurement residuals with fixed integer estimate is larger than 0.06 m, the integer estimates are rejected. Other integer validation techniques, e.g. ratio test, can be applied. Only validated results are recorded.

For the stationary data, the position of the antenna is surveyed and known with an accuracy at the millimeter level. The algorithm itself has no knowledge of this ground truth position.

For each 10-second CRT windows, the algorithm estimates $$X = [x(t_1)^T, x(t_2)^T, \ldots, x(t_{10})^T]^T.$$

For the 43200-sec stationary data, 569 trials failed with m<5, 38167 trials are validated (i.e., m≥5 and the residual check passed). The positioning results are presented through comparison with the ground truth (i.e., $$p(t_k) - p_0$$

where $$p_0$$

is the ground truth position).

To evaluate the performance of the positioning, the maximum norm of the horizontal position error over each CRT window 110 was logged and is shown as a histogram in FIG. 4. Accuracies below 0.02 m are typical, which matches the expected performance of RTK GNSS positioning. In particular, FIG. 4A shows stationary data horizontal error, FIG. 4B shows stationary data residuals, FIG. 4C shows moving data horizontal error, and FIG. 4D shows moving data residuals. In particular, FIG. 4B shows that the vast majority of the L1 phase residuals lie in [−0.02, 0.02] m.

Figure 5:
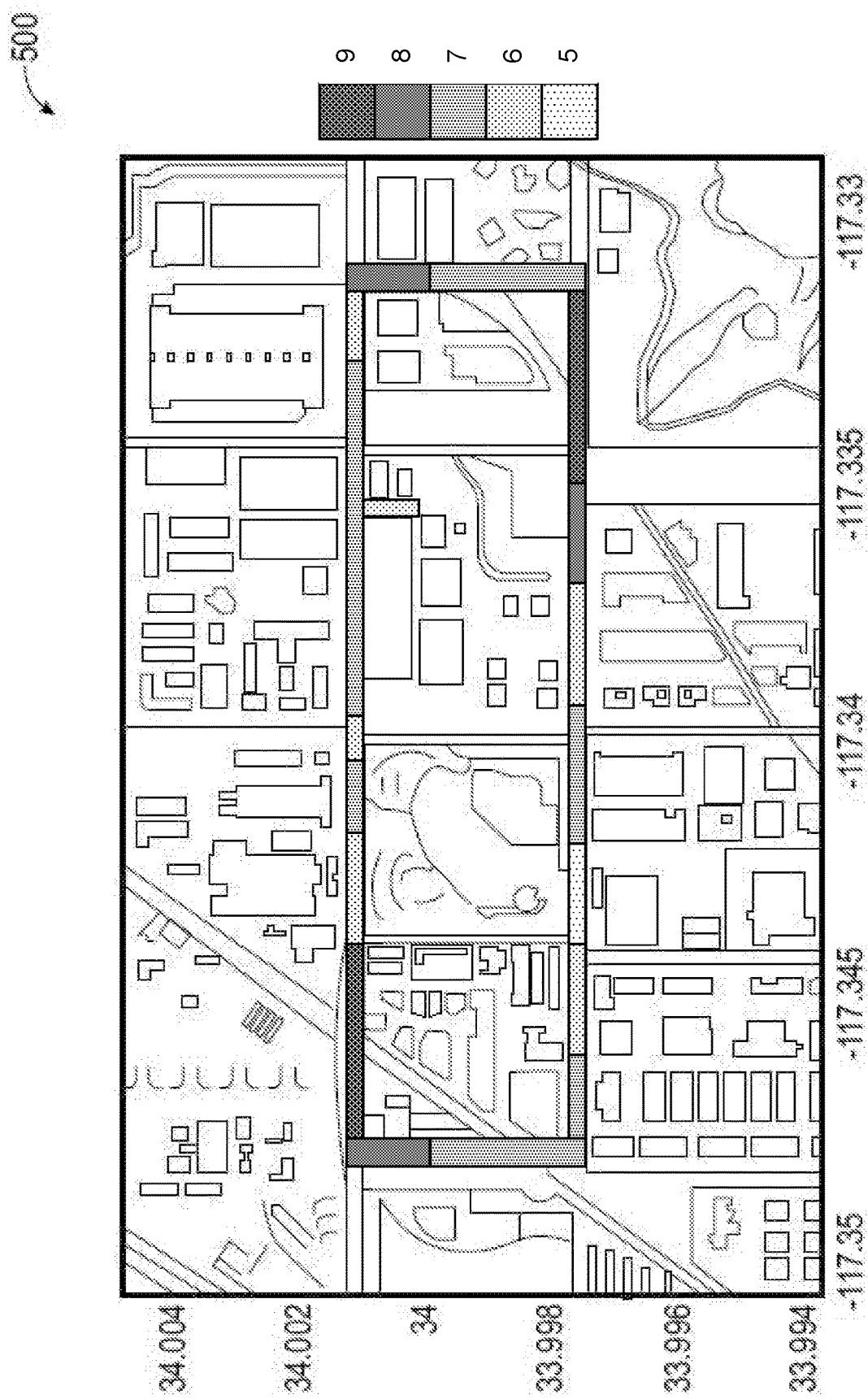
FIG. 5 is a top-down image of moving data results, according to some embodiments.

FIG. 5 is a top-down image of moving data results 500, according to some embodiments. The route and satellite availability while logging this dataset are shown in FIG. 5. The route and the satellite availability of the 640 s moving data experiment. The x-axis and y-axis are the longitude and latitude in degrees. The intensity of shading along the route indicate the number of satellites visible to the receiver at that location and time. The average vehicle speed is 35 km/h. Since the ground truth is not available for this dataset, the implementation results of the CPS method are compared with those from the original full MILS method. Implementation results show that all the validated integers from CPS are identical to those from the full MILS method. As described above, FIG. 4A shows that the maximum norm, during each CRT window 110, of the horizontal position error between CPS and full MILS are bounded by 0.04 m and typically less than 0.02 m. This demonstrates that the CPS method is a good approximation of the full MILS method in terms of integer ambiguity resolution and positioning.

Figure 6A:
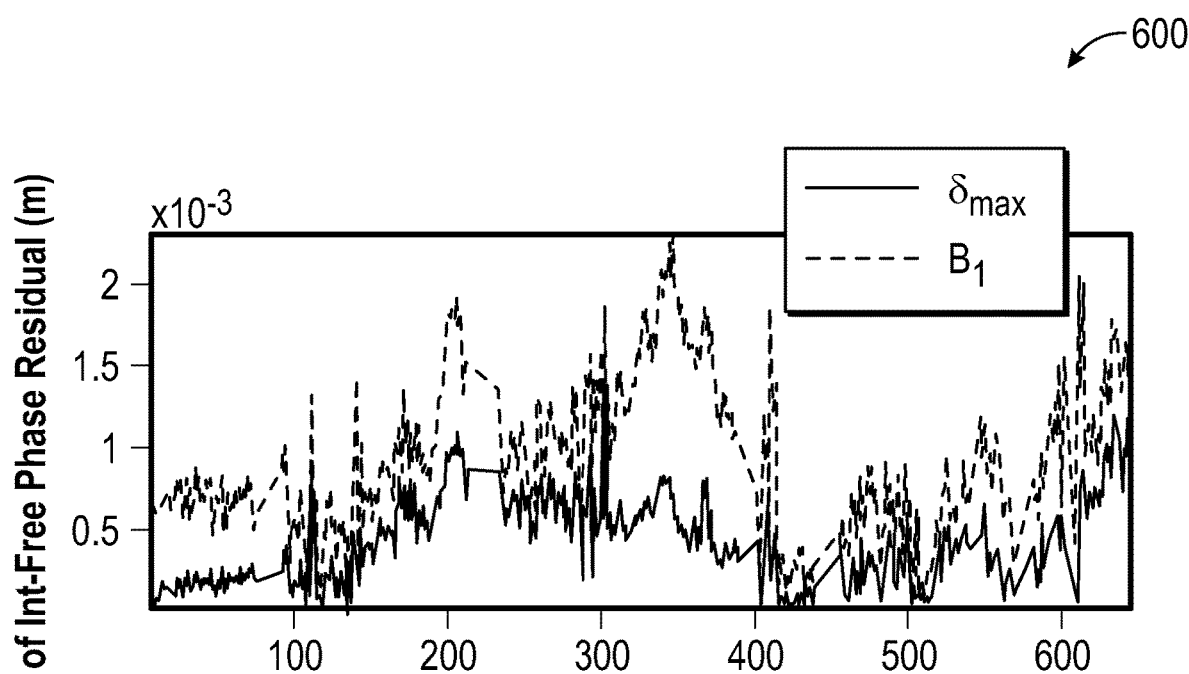
FIGS. 6A-6B are graphs of 3-D position shift, according to some embodiments.
Figure 6B:
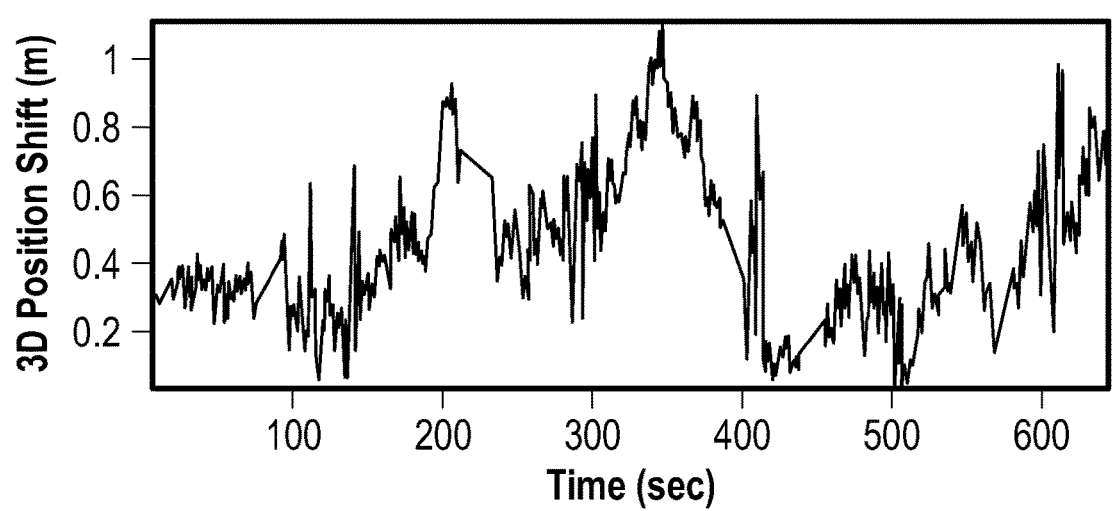
Figure 7A:
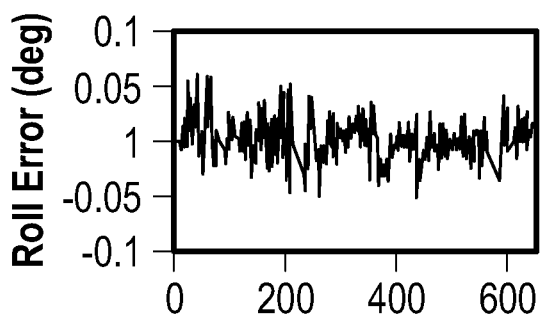
FIGS. 7A-7L are graphs of maximal differences between the CPS estimates and the full Mixed Integer Least Square (MILS) estimates of attitude, velocity, and bias, according to an embodiment.
Figure 7B:
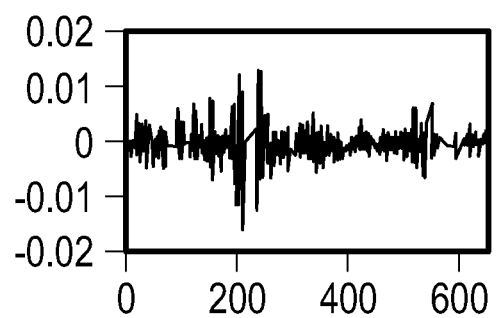
Figure 7C:
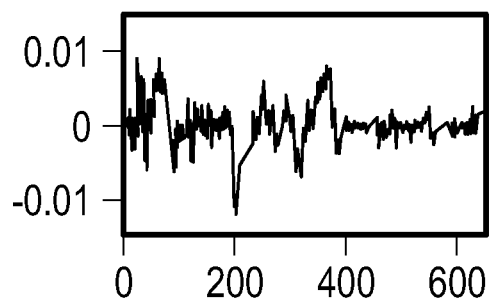
Figure 7D:
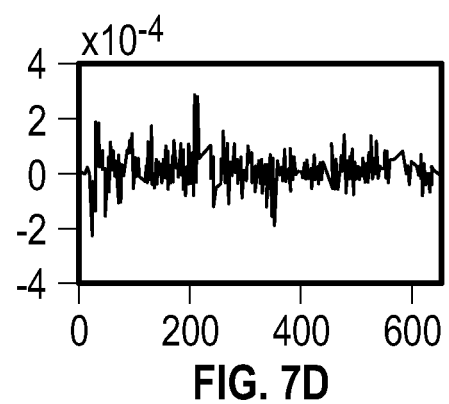
Figure 7E:
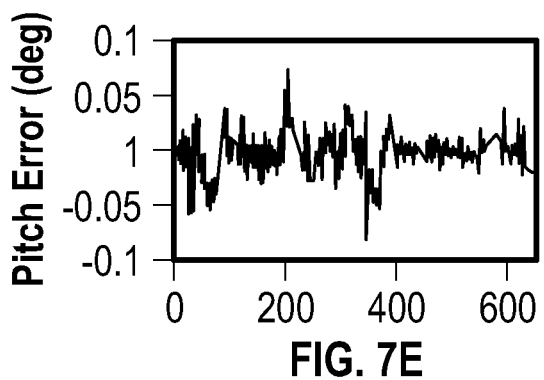
Figure 7F:
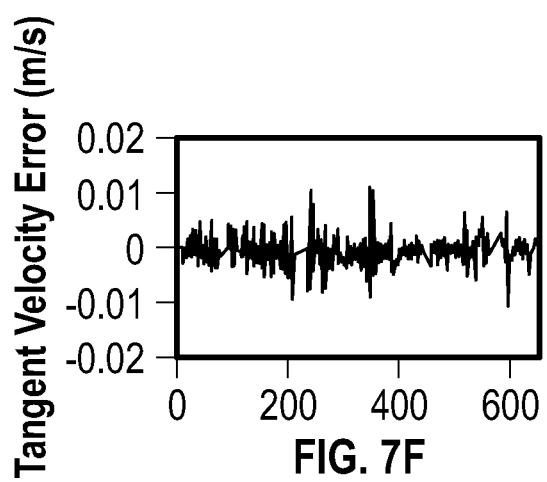
Figure 7G:
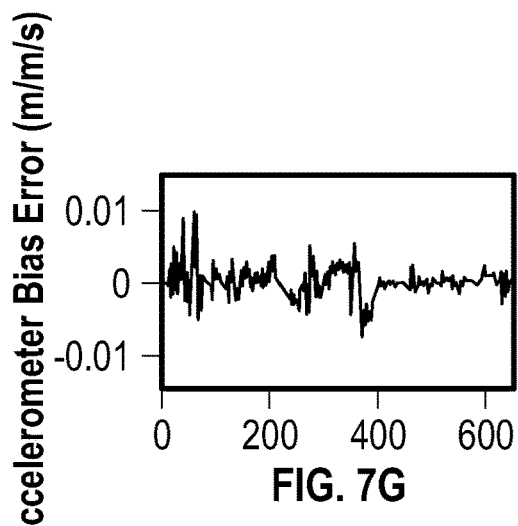
Figure 7H:
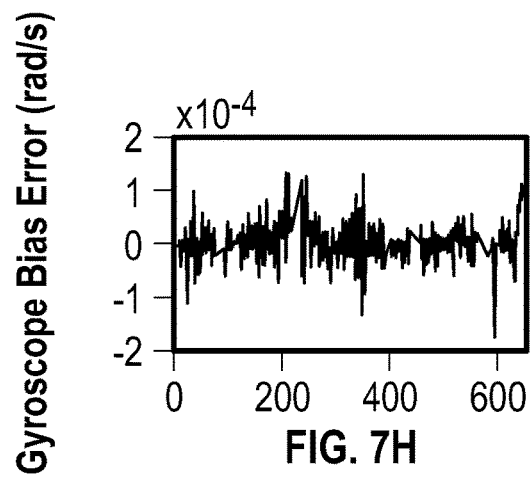
Figure 7I:
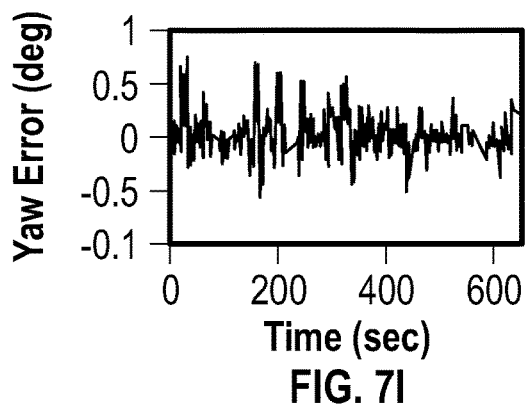
Figure 7J:
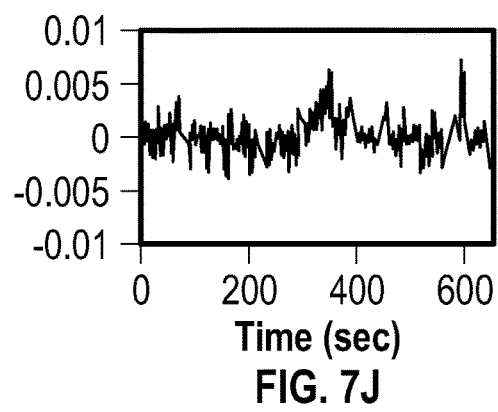
Figure 7K:
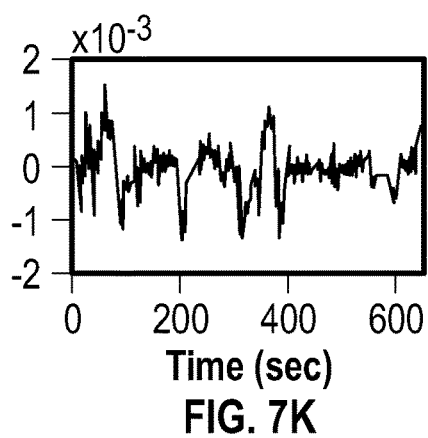
Figure 7L:
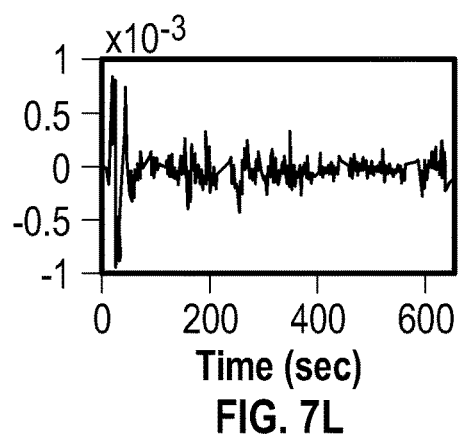

FIGS. 6A and 6B are graphs of 3-D position shift 600, according to some embodiments. In particular, FIG. 6A depicts the magnitude of the 3-D position shift estimated by CPS, and FIG. 6B shows variations of $\|r_4\|^2$ caused by the common position shift. FIG. 6 serves to validate Proposition 2, as described below. For the i-th satellite in each time window, defined $$\Delta r^i \triangleq \bar{Q}_1^T(h^i(\check{X} \oplus \Delta p^*) - \varphi^2) - \bar{Q}_1^T(h^i(\check{X}) - \varphi^i),$$

which is the variation of the integer-free phase measurement residuals (see Proposition 2) caused by the estimated common-position-shift $$\Delta p^*.$$

Furthermore, $$\Delta r^i$$

can be rewritten as $$\Delta r^i = \bar{Q}_1^T(h^i(\check{X} \oplus \Delta p^*) - h^i(\check{X}))$$

position.

For the moving data, the maximal magnitude of $$\Delta r^i$$

over each CRT window 110, i.e., $$\delta_{max} = \max_i \{\|\Delta r^i\|_\infty\}$$

is recorded along with the magnitude of common-position-shift $$\|\Delta p^*\|$$

for each CRT window 110.

Proposition 2 implies that a common-position-shift will only cause small variations, $$\Delta r^i,$$

that are upper-bounded by $$B_1(\|\Delta p^*\|, \bar{v}).$$

FIG. 6 validates this claim by plotting $$\delta_{max}, \|\Delta p^*\|$$

and the bound B1 calculated in equation (33). FIG. 6 also shows that in this data set, all the common-position-shift estimates have norm less than 1.2 meter, as expected.

FIGS. 7A-7L are graphs of maximal differences between the CPS estimates and the full MILS estimates of attitude, velocity, and bias 700, according to an embodiment. FIG. 7 shows that the roll and pitch estimate errors are smaller than 0.1 degree, and for yaw angle most of the errors are smaller than 0.5 degree. The velocity estimate errors between two methods are smaller than 0.02 m/s.

Figure 8:
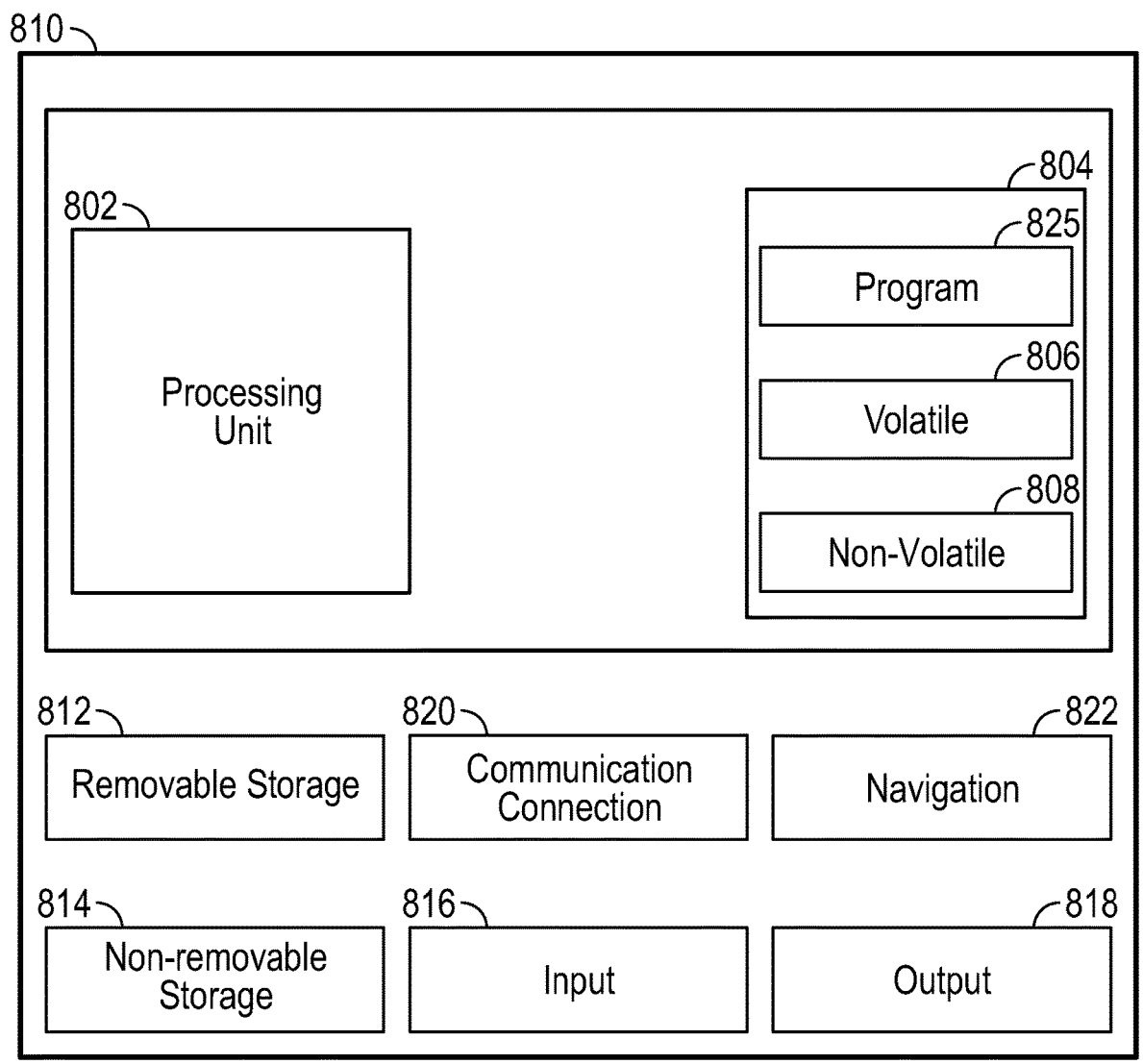
FIG. 8 is a block diagram of a computing device, according to an embodiment.

FIG. 8 is a block diagram of a computing device 800, according to an embodiment. In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 8 is an example of a client device that may invoke methods described herein over a network. In other embodiments, the computing device is an example of a computing device that may be included in or connected to a motion interactive video projection system, as described elsewhere herein. In some embodiments, the computing device of FIG. 8 is an example of one or more of the personal computer, smartphone, tablet, or various servers.

One example computing device in the form of a computer 810, may include a processing unit 802, memory 804, removable storage 812, and non-removable storage 814. Although the example computing device is illustrated and described as computer 810, the computing device may be in different forms in different embodiments. For example, the computing device may instead be a smartphone, a tablet, or other computing device including the same or similar elements as illustrated and described with regard to FIG. 8. Further, although the various data storage elements are illustrated as part of the computer 810, the storage may include cloud-based storage accessible via a network, such as the Internet.

Returning to the computer 810, memory 804 may include volatile memory 806 and non-volatile memory 808. Computer 810 may include or have access to a computing environment that includes a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The input 816 may include one or more of a touchscreen, touchpad, mouse, keyboard, camera, and other input devices. The computer may operate in a networked environment using a communication connection 820 to connect to one or more remote computers, such as database servers, web servers, and other computing device. An example remote computer may include a personal computer (PC), server, router, network PC, a peer device or other common network node, or the like. The communication connection 820 may be a network interface device such as one or both of an Ethernet card and a wireless card or circuit that may be connected to a network. The network may include one or more of a Local Area Network (LAN), a Wide Area Network (WAN), the Internet, and other networks.

Computer 810 may include or have access to a computing environment that provides data from a navigation device or module 822. Navigation 822 may include a GNSS device, which may output pseudorange, carrier-phase, position, velocity, acceleration, or other navigation data. Navigation 822 may include an IMU device, which may output single-axis or multiple-axis accelerometer data, gyroscopic data, magnetometers, compasses, pressure sensors, or other sensor data. The sensor data may be provided by integrated or discrete sensors within the IMU device. Navigation 822 may include complimentary localization and mapping, such as cellular or access point triangulation (e.g., based on signal strength or RSSI), Simultaneous Localization and Mapping (SLAM, e.g., Wi-Fi SLAM), or other mapping data. The navigation data may include raw device measurements, calculated position or navigation data from a single component (e.g., GNSS location or IMU roll, pitch, and yaw), a navigation solution that combines input from two or more devices (e.g., tightly coupled GNSS/INS navigation solution), or combinations thereof. Potential applications may include wearables, mobile devices, manned and autonomous aerial/space/terrestrial/naval vehicles, remote tracking, guided weapons, networked and aggregated over a distributed system, and other applications. Potential applications may include portable electronic devices, such as wearable electronic devices, autonomous electronic devices, or other electronic devices.

Computer-readable instructions stored on a computer-readable medium are executable by the processing unit 802 of the computer 810. A hard drive (e.g., magnetic disk or solid state), CD-ROM, and RAM are some examples of articles including a non-transitory computer-readable medium. For example, various computer programs 825 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

APPENDIX I: INS DISCUSSION

For any initial state $x(\tau_k)$, the solution to (1) for $t \in [\tau_k, \tau_k+1]$ is $$x(t) = x(\tau_k) + \int_{\tau_k}^{t} f(x(\tau), u(\tau)) d\tau. \tag{47}$$

While nature solves (47) in continuous time, the INS only has IMU and aiding measurements at discrete time instants; therefore, the INS numerically solves $$\hat{x}(\tau_{k+1}) = \phi(\hat{x}(\tau_k), \hat{u}(\tau_k)) \tag{48}$$

$$= \hat{x}(\tau_k) + \int_{\tau_k}^{\tau_{k+1}} f(\hat{x}(\tau), \hat{u}(\tau)) d\tau,$$

where $\varphi$ is defined as the integration operator. The result of the numeric integration of (48) is the INS state estimate of $\hat{x}(\tau_{k+1})$ given $\hat{x}(\tau_k)$ and $\hat{u}(\tau_k)$. The numeric integration repeats to propagate the state measurements between the times of aiding measurements. The aiding measurement times can be unequally spaced in time without causing any complications.

Let $$\tilde{U}_j = \{\hat{u}(\tau_k), \tau_k \in [t_j, t_{j+1}]\},$$

then equation (48) can be called recursively to compute $$\hat{x}(t_{j+1})$$

from $$\hat{x}(t_j)$$

and $$\tilde{U}_j,$$

denote this as $$\hat{x}(t_{j+1}) = \Phi(\hat{x}(t_j), \tilde{U}_j)). \tag{49}$$

At the same time, nature is integrating equation (47) which it denoted as $$x(t_{j+1}) = \Phi(x(t_j), U_j)). \tag{50}$$

The linearized error growth model is $$\delta \hat{x}(t_{j+1}) = \Phi_j \delta \hat{x}(t_j) + \omega_j \tag{51}$$

where $$\omega_j \sim N(0, Q_j)$$

and $$\Phi_j = \frac{\partial \phi(x)}{\partial x} \bigg|_{(\hat{x}(t_1), \tilde{U}_j)}$$

The INS provides both $Q_j$ and $\Phi_j$.

APPENDIX II

To better illustrate the method and apparatuses disclosed herein, a non-limiting list of embodiments is provided here:

Example 1 is a system to reduce computational complexity of integer ambiguity resolution, the system comprising: a differential global navigation satellite system (DGNSS) to provide a plurality of carrier-phase measurements; and a processor configured to determine a plurality of carrier-phase integer values based on the plurality of carrier-phase measurements.

In Example 2, the subject matter of Example 1 optionally includes wherein the processor is further configured to verify the plurality of carrier-phase integer values.

In Example 3, the subject matter of any one or more of Examples 1-2 optionally include wherein: the DGNSS is further configured to provide a plurality of code measurements; and the processor is further configured to determine a float solution based on the plurality of code measurements and the plurality of carrier-phase measurements, wherein the processor is to determine the plurality of carrier-phase integer values based on the float solution.

In Example 4, the subject matter of Example 3 optionally includes wherein the processor determining the float solution includes the processor removing at least one outlier.

In Example 5, the subject matter of any one or more of Examples 3-4 optionally include an inertial measurement unit (IMU), the IMU to provide a plurality of IMU measurements, wherein the processor is to determine the float solution based on the plurality of IMU measurements.

In Example 6, the subject matter of Example 5 optionally includes wherein the processor is further configured to determine a common position shift (CPS) vector based on the float solution.

In Example 7, the subject matter of Example 6 optionally includes a memory to store the CPS vector and plurality of carrier-phase integer values.

In Example 8, the subject matter of Example 7 optionally includes wherein the processor is further configured to determine a position estimate based on the float solution and the CPS vector.

Example 9 is a method to reduce computational complexity of integer ambiguity resolution, the method comprising: receiving a plurality of differential global navigation satellite system (DGNSS) carrier-phase measurements; and determining a plurality of carrier-phase integer values based on the plurality of carrier-phase measurements.

In Example 10, the subject matter of Example 9 optionally includes verifying the plurality of carrier-phase integer values.

In Example 11, the subject matter of any one or more of Examples 9-10 optionally include receiving a plurality of differential DGNSS code measurements; and determining a float solution based on the plurality of code measurements and the plurality of carrier-phase measurements, wherein the determining of the plurality of carrier-phase integer values is based on the float solution.

In Example 12, the subject matter of Example 11 optionally includes wherein determining the float solution further includes removing at least one outlier.

In Example 13, the subject matter of any one or more of Examples 11-12 optionally include receiving a plurality of inertial measurement unit (IMU) measurements, wherein determining the float solution is further based on the plurality of IMU measurements.

In Example 14, the subject matter of Example 13 optionally includes determining a common position shift (CPS) vector based on the float solution.

In Example 15, the subject matter of Example 14 optionally includes storing the CPS vector and plurality of carrier-phase integer values in a memory.

In Example 16, the subject matter of Example 15 optionally includes determining a position estimate based on the float solution and the CPS vector.

Example 17 is a machine-readable medium including instructions, which when executed by a computing system, cause the computing system to perform any of the methods of Examples 9-16.

Example 18 is an apparatus comprising means for performing any of the methods of Examples 9-16.

Example 19 is at least one machine-readable storage medium, comprising a plurality of instructions that, responsive to being executed with processor circuitry of a computer-controlled device, cause the computer-controlled device to: receive a plurality of differential global navigation satellite system (DGNSS) carrier-phase measurements; and determine a plurality of carrier-phase integer values based on the plurality of carrier-phase measurements.

In Example 20, the subject matter of Example 19 optionally includes wherein the instructions further cause the computer-controlled device to verify the plurality of carrier-phase integer values.

In Example 21, the subject matter of any one or more of Examples 19-20 optionally include wherein the instructions further cause the computer-controlled device to: receive a plurality of differential DGNSS code measurements; and determine a float solution based on the plurality of code measurements and the plurality of carrier-phase measurements, wherein the determining of the plurality of carrier-phase integer values is based on the float solution.

In Example 22, the subject matter of Example 21 optionally includes wherein determining the float solution further includes removing at least one outlier.

In Example 23, the subject matter of any one or more of Examples 21-22 optionally include wherein the instructions further cause the computer-controlled device to receive a plurality of inertial measurement unit (IMU) measurements, wherein determining the float solution is further based on the plurality of IMU measurements.

In Example 24, the subject matter of Example 23 optionally includes wherein the instructions further cause the computer-controlled device to determine a common position shift (CPS) vector based on the float solution.

In Example 25, the subject matter of Example 24 optionally includes wherein the instructions further cause the computer-controlled device to store the CPS vector and plurality of carrier-phase integer values in a memory.

In Example 26, the subject matter of Example 25 optionally includes wherein the instructions further cause the computer-controlled device to determine a position estimate based on the float solution and the CPS vector.

Example 27 is a apparatus comprising means for receiving a plurality of differential global navigation satellite system (DGNSS) carrier-phase measurements; and determining a plurality of carrier-phase integer values based on the plurality of carrier-phase measurements.

In Example 28, the subject matter of Example 27 optionally includes means for verifying the plurality of carrier-phase integer values.

In Example 29, the subject matter of any one or more of Examples 27-28 optionally include means for: receiving a plurality of differential DGNSS code measurements; and determining a float solution based on the plurality of code measurements and the plurality of carrier-phase measurements, wherein the determining of the plurality of carrier-phase integer values is based on the float solution.

In Example 30, the subject matter of Example 29 optionally includes wherein determining the float solution further includes removing at least one outlier.

In Example 31, the subject matter of any one or more of Examples 29-30 optionally include means for receiving a plurality of inertial measurement unit (IMU) measurements, wherein determining the float solution is further based on the plurality of IMU measurements.

In Example 32, the subject matter of Example 31 optionally includes means for determining a common position shift (CPS) vector based on the float solution.

In Example 33, the subject matter of Example 32 optionally includes means for storing the CPS vector and plurality of carrier-phase integer values in a memory.

In Example 34, the subject matter of Example 33 optionally includes means for determining a position estimate based on the float solution and the CPS vector.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system to reduce computational complexity of integer ambiguity resolution, the system comprising:
    a differential global navigation satellite system (DGNSS) to provide a plurality of carrier-phase measurements and a plurality of code measurements;
    an inertial measurement unit (IMU), the IMU to provide a plurality of IMU measurements; and
    a processor configured to:
        determine a float solution based on the plurality of carrier-phase measurements, the plurality of code measurements, and the plurality of IMU measurements; and
        determine a common position shift (CPS) vector based on the float solution, a plurality of code measurements, and a plurality of carrier-phase measurements.

2. The system of claim 1, wherein the processor is further configured to verify the plurality of carrier-phase integer values.

3. The system of claim 1, wherein the processor is further configured to determine a plurality of carrier-phase integer values based on the float solution and the plurality of carrier-phase measurements.

4. The system of claim 1, wherein the processor determining the float solution includes the processor removing at least one outlier.

5. The system of claim 3, further including a memory to store the CPS vector and the plurality of carrier-phase integer values.

6. The system of claim 1, wherein the processor is further configured to determine a position estimate based on the float solution and the CPS vector.

7. A method to reduce computational complexity of integer ambiguity resolution, the method comprising:
    receiving a plurality of differential global navigation satellite system (DGNSS) carrier-phase measurements, a plurality of DGNSS code measurements, and a plurality of inertial measurement unit (IMU) measurements;
    determining a float solution based on the plurality of code measurements, the plurality of carrier-phase measurements, and the plurality of IMU measurements; and
    determining a common position shift (CPS) vector based on the float solution, a plurality of code measurements, and a plurality of carrier-phase measurements.

8. The method of claim 7, further including verifying the plurality of carrier-phase integer values.

9. The method of claim 7, further including determining a plurality of carrier-phase integer values based on the float solution and the plurality of carrier-phase measurements.

10. The method of claim 7, wherein determining the float solution further includes removing at least one outlier.

11. The method of claim 9, further including storing the CPS vector and the plurality of carrier-phase integer values in a memory.

12. The method of claim 7, further including determining a position estimate based on the float solution and the CPS vector.

13. A machine-readable medium including instructions, which when executed by a computing system, cause the computing system to perform the method of claim 7.

14. An apparatus comprising means for performing the method of claim 7.

* * * * *